United States Patent [19]
Brecht

[11] Patent Number: 6,164,309
[45] Date of Patent: Dec. 26, 2000

[54] LIQUID FILLING DEVICE

[75] Inventor: William B. Brecht, Seal Beach, Calif.

[73] Assignee: Trojan Battery Company, Santa Fe Springs, Calif.

[21] Appl. No.: 09/380,818

[22] PCT Filed: Mar. 13, 1997

[86] PCT No.: PCT/US97/04159

§ 371 Date: Sep. 8, 1999

§ 102(e) Date: Sep. 8, 1999

[87] PCT Pub. No.: WO98/40653

PCT Pub. Date: Sep. 17, 1998

[51] Int. Cl.[7] .................................................. F16K 49/00
[52] U.S. Cl. ........................... 137/14; 137/260; 137/261; 137/247.39; 137/340
[58] Field of Search .............. 137/14, 260, 261, 137/247.39, 340

[56] References Cited

U.S. PATENT DOCUMENTS

| | | |
|---|---|---|
| 539,689 | 5/1895 | Knispel . |
| 1,765,433 | 6/1930 | Lavett . |
| 1,791,152 | 2/1931 | Van Meter, Jr. . |
| 1,869,258 | 7/1932 | Holland . |
| 1,878,223 | 9/1932 | Woodbridge . |
| 2,135,158 | 11/1938 | Wolford ..................................... 137/21 |
| 3,372,716 | 3/1968 | Hommel et al. .......................... 141/59 |
| 4,087,592 | 5/1978 | Okazaki et al. .......................... 429/63 |
| 4,522,896 | 6/1985 | Iseard ........................................ 429/63 |
| 4,751,156 | 6/1988 | Olimpio .................................... 429/64 |
| 4,754,777 | 7/1988 | Frode ....................................... 137/261 |

*Primary Examiner*—A. Michael Chambers
*Attorney, Agent, or Firm*—Christie, Parker & Hale, LLP

[57] ABSTRACT

A liquid filling device for watering batteries comprises a body having first and second water ports that extend through the body and connect within it to first and second water passages that are independent of one another. A trap is disposed the device at a position below the first and second water passages. A bell chamber is disposed at an outlet of the trap and includes an open end. Water passes through the device via a one of the first or second water passages, through the trap, through the bell chamber and into a battery cell. The device traps a volume of air therein and pressurizes the trapped air, as the electrolyte level in the cell rises to a determined level, to an amount at least equal to the head pressure of water in the device, thereby terminating further water flow into the cell. The device includes a gas vent for releasing gas pressure from the cell to the atmosphere or to collection for further treatment. The device is operated by imposing a pressure differential, by either pressure or vacuum conditions, between water inlet and outlet passages of sufficient amount to effect water flow into and through the device.

39 Claims, 11 Drawing Sheets

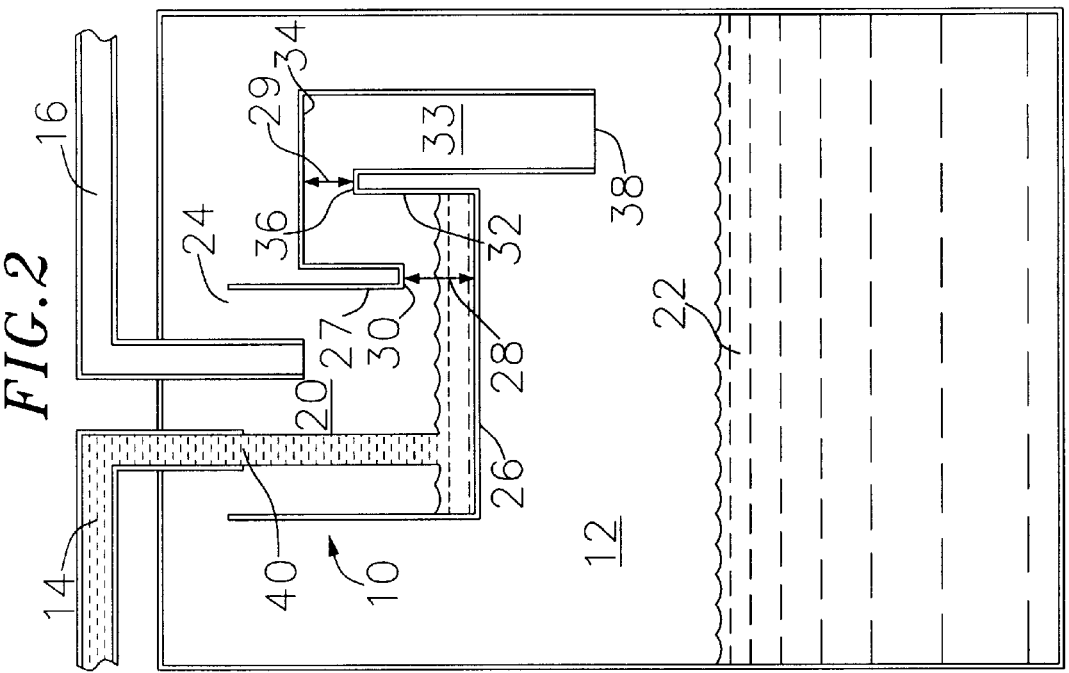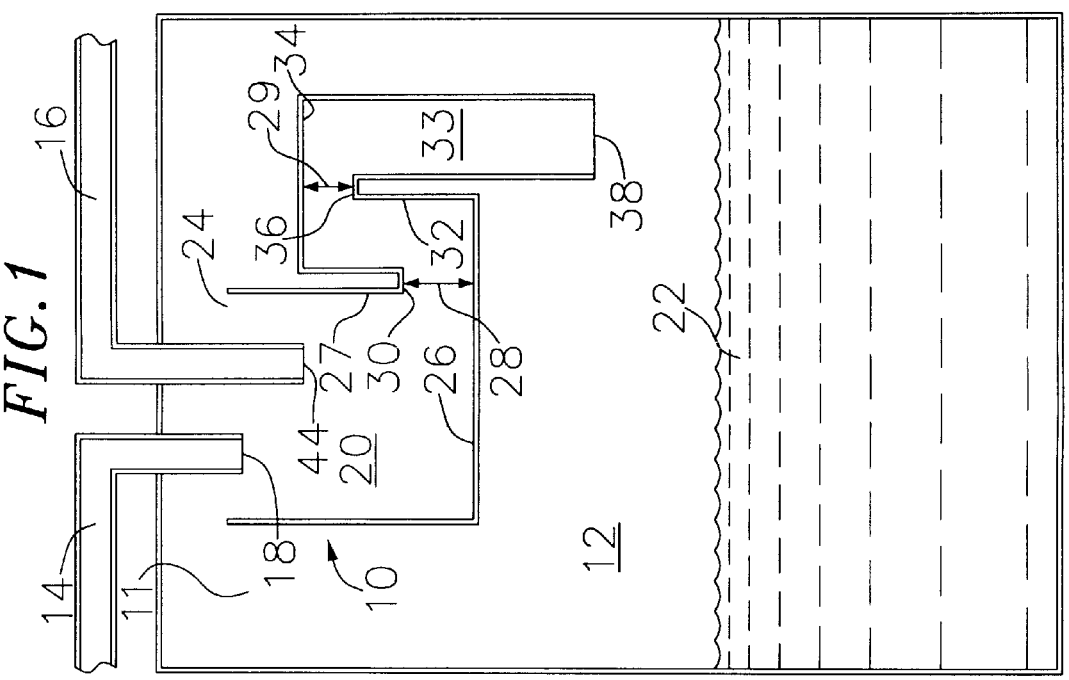

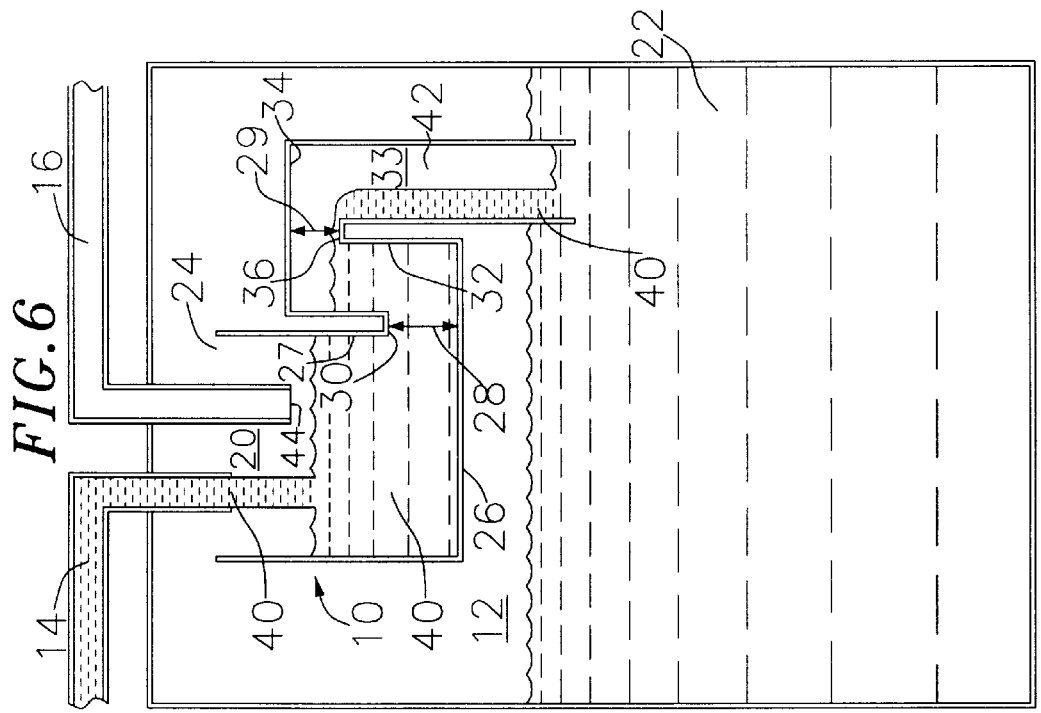
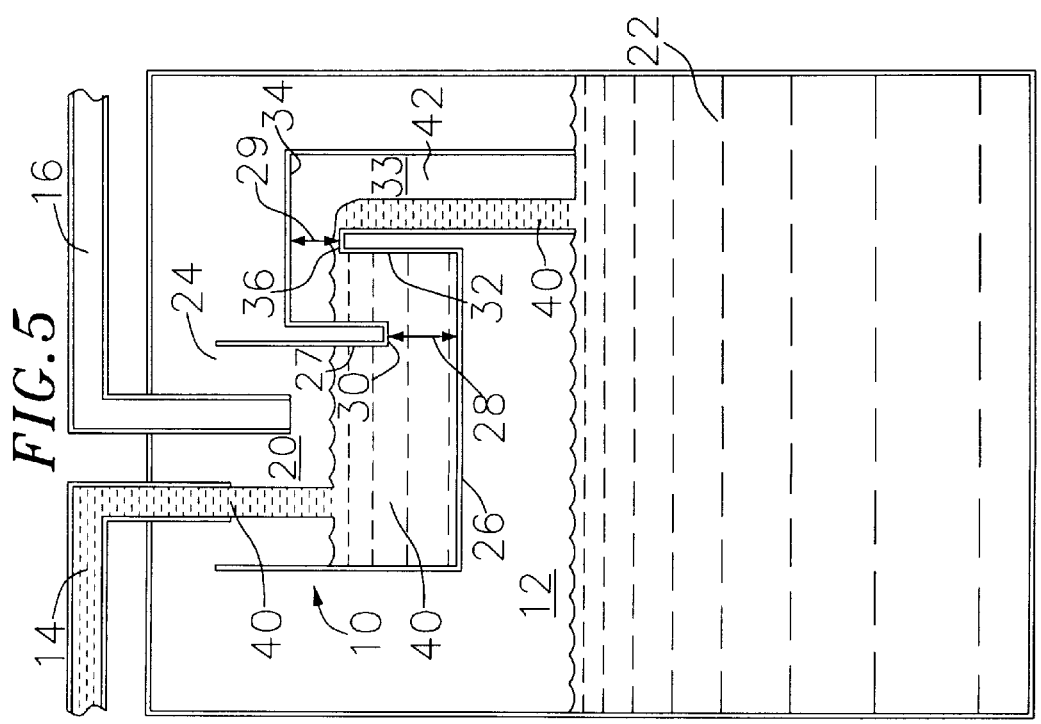

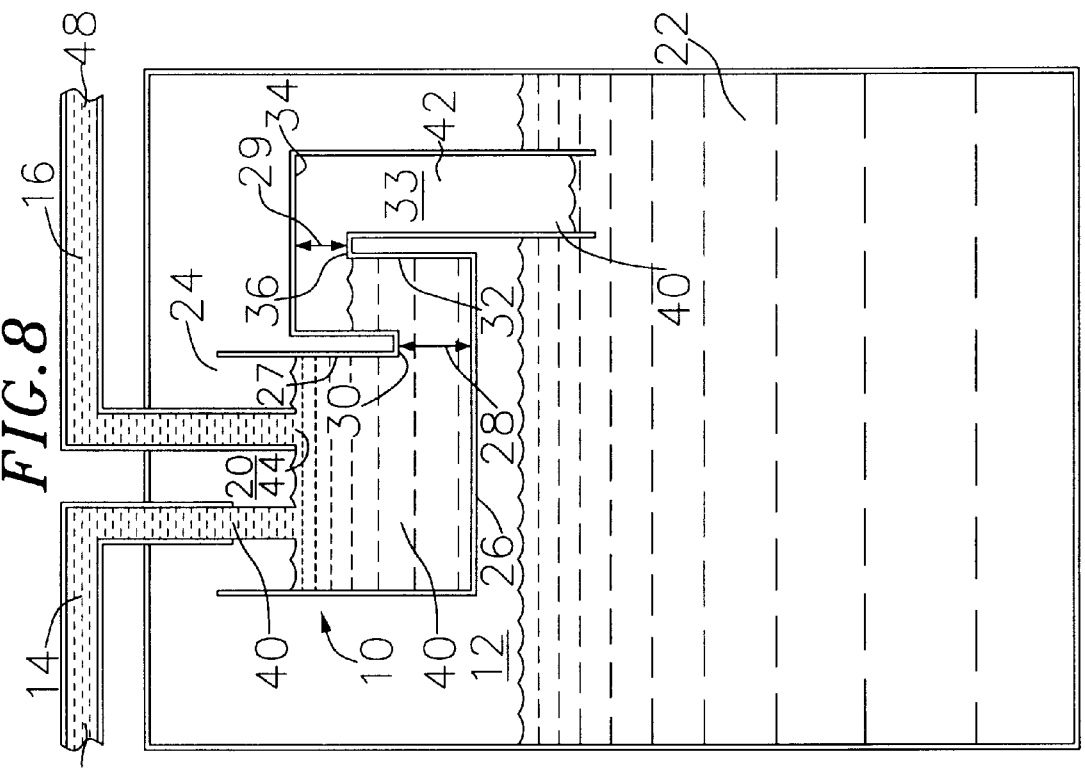
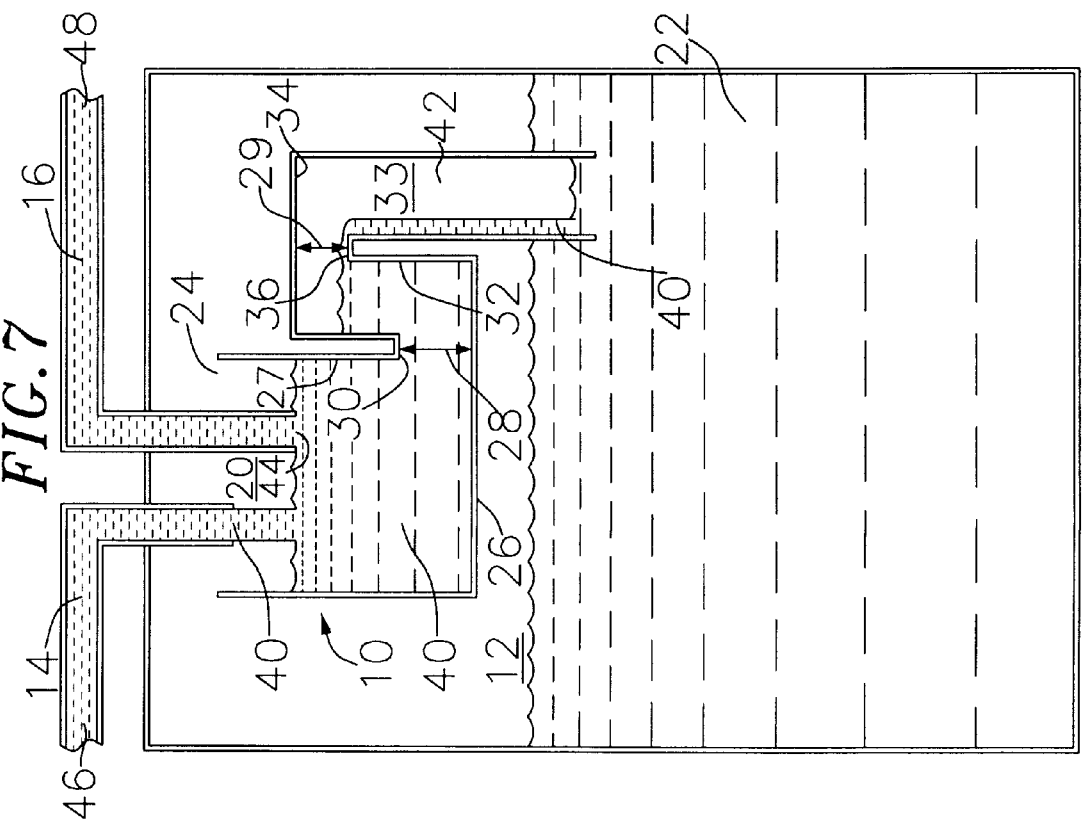

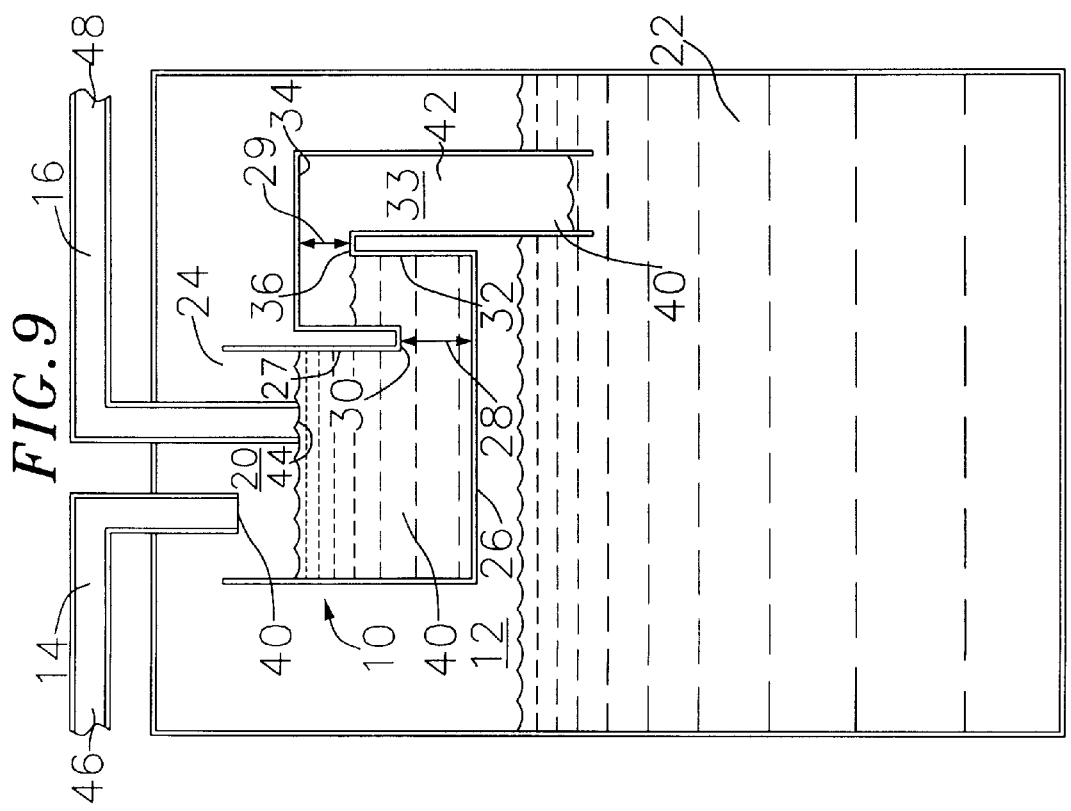

LIQUID FILLING DEVICE

FIELD OF THE INVENTION

This invention relates to devices that are used to fill one or more electrolytic cells of an electrolyte battery with water and, more particularly, to a liquid filling device adapted to fill one or more electrolytic cells of an electrolyte battery with water without the use of moving parts, and without the need for circulating battery electrolyte from the cells.

BACKGROUND OF THE INVENTION

Batteries that comprise liquid electrolyte, such as lead acid batteries or the like used in deep cycle or other applications, require for optimum performance that the liquid electrolyte contained within each electrolytic cell be maintained at a specific electrolyte level. The desired electrolyte level generally corresponds to the volume of electrolyte that is needed to completely submerge the battery electrode plates contained within the electrolytic cell. Completely submerging the electrode plates of the battery with electrolyte promotes optimal battery operation, as it provides a maximum degree of electrolyte to electrode plate contact, and thereby promotes a maximum degree of electricity generating electrochemical reaction within each electrolytic cell of the battery.

To maintain an optimal level of battery performance, and to maximize battery service life, the battery electrolyte level must be checked regularly and replenished in the event that it is below a desired level. The electrolyte level in the electrolytic cells of a battery is not static, but is dynamic due to the effects of evaporation, leakage or spillage, and due to outgassing that occurs during overcharge in the charging process. To obtain maximum results during battery charging it is desired that the battery electrolyte level be checked and adjusted during and after the charging operation, to thereby ensure a maximum degree of electrolyte to electrode interface during the charging process.

An electrolyte battery typically comprises a number of electrolytic cells. For example, a conventional 12 volt electrolyte battery comprises six two-volt electrolytic cells. Different battery applications call for different overall battery voltages and, therefore, different battery configurations. Such battery applications typically require that the battery be stored onboard the battery-powered device or vehicle at a location that does not always permit easy access to each electrolytic cell, making electrolyte level inspection and electrolyte replenishment difficult and time consuming.

Devices have been constructed in an attempt to address such difficulties associated with electrolyte level checking and electrolyte replenishing in such applications. To reduce or eliminate the risk of environmental hazard or health danger during the electrolyte replenishment operation, it is desired that only water be used or circulated to fill the electrolytic cells.

Devices known in the art that have been developed to facilitate electrolyte leveling and replenishment include so called "pass-through" devices that are adapted for installation into each electrolytic cell of the battery. Such pass-through devices typically include an inlet port and an outlet port that are positioned within the cell to permit flow-through passage of electrolyte from the cell when a determined electrolyte level in that cell is achieved. The pass-through devices are installed into each electrolytic cell of the battery and are hydraulically connected together to permit the serial circulation of electrolyte through each electrolytic cell, filling each cell to a determined electrolyte level, and finally out of the battery for collection.

Electrolyte replenishment or filling is accomplished using such a pass-through device by routing water from a water source to a first device, that is disposed in a first electrolytic cell, until the electrolyte level reaches a determined level. While water addition to the first filled cell is continued, water mixed with electrolyte from the filled cell is routed through its respective device to another device that is installed in a different cell. This chain of electrolyte transfer continues until the determined electrolyte level in a final battery cell is achieved and electrolyte is routed away from the battery and the water flow is discontinued.

A disadvantage of the pass-through device is that it requires electrolyte, rather than only water, to be transferred through the electrolytic cells and eventually away from the battery, where it can pose an environmental or health risk. Additionally, when connected in series with a number of other such devices, the device is unable to provide a desired concentration of electrolyte in each cell. Rather, as mixed water and electrolyte is circulated through each cell the electrolyte concentration in each cell become progressively more diluted than the next cell in the series, thereby causing the electrolyte concentration in each cell to vary.

Another device designed to facilitate electrolyte leveling and replenishment is a mechanical "float-type" device that is configured to fit into an electrolyte fill opening of an electrolytic cell. The device comprises a body that is engaged into the fill opening. A plunger extends from the body into the cell and includes a float that is designed to float in the electrolyte. The body includes a valve mechanism which is located outside of the electrolytic cell and is designed to open and close the flow of water through a water inlet in the body to the cell, depending on the position of the plunger and float.

When the electrolyte level in a cell is low, and the plunger and float extend downwardly into the cell a determined distance, the valve in the body is opened to permit water flow into the cell. Once a desired electrolyte level is achieved, and the plunger and float rises in the cell to a determined point, the valve is closed, causing water flow to the cell to cease. The device also includes a vent passage in the body that allows air being displaced by the water entering the cell to be routed from the cell through the body and to the atmosphere. These devices, when installed in respective cells, are hydraulically connected to a water source in parallel so that as the electrolyte level in each particular cell is achieved the water flow to that cell is shut off.

Embodiments of the above-described float-type device are designed to permit the filling of more than one electrolytic cell from a single location. In such an embodiment, each device additionally comprises a water outlet that permits the passage of water through its body either during or after the determined electrolyte level, for the particular cell within which the device is installed, is achieved. The device is placed into each electrolytic cell and is hydraulically connected, with piping or tubing and the like, to permit electrolyte filling of each cell with water from a single point. The use of such device allows the electrolyte level in each cell to be replenished without circulating electrolyte between cells and away from the battery.

Although such a device permits circulation of water from a water source through each device without allowing electrolyte to leave the battery, it does so using mechanically moving parts, e.g., the plunger and valve arrangement. The use of a device having moving parts in an electrolyte battery cell service is not desired because of the likelihood that such mechanism will fail, or its operation will become impaired or unpredictable, due to its exposure to the highly corrosive environment of the electrolytic cell, e.g., its exposure to sulfuric acid, sulfuric acid vapors and the like. Sulfuric acid vapors, nascent oxygen, and hydrogen produced during operation or charging of the battery are allowed to escape from each cell via a passage through the device body, thereby placing the moving parts in direct exposure to such corrosive and highly aggressive vapors. It is known that prolonged exposure to such vapors eventually reduces the operating life of the device due to part failure.

Additionally, plastics and rubbers that are used in conjunction with the device and/or device-to-cell seal are known to decompose after being exposed to such corrosive liquid and/or vapor. The products of such decomposing material enter the device and are known to interfere with the movement of the parts, e.g., causing the valve to stick in an open or closed position and, thereby rendering the device inoperative. Additionally, the decomposition products of such plastic and rubber parts are known to enter the electrolytic cell, interfering with the efficiency of electrochemical reaction occurring therein.

U.S. Pat. No. 4,754,777 discloses another device for replenishing the electrolyte level in electrolyte battery cells. The device comprises a body that fitted into the fill opening of an electrolytic cell. The body has no moving parts, but provides water flow into the cell from a water inlet via a water trap arrangement. The water trap is designed so that water from the water inlet is directed through the trap at a particular supply pressure and into the electrolytic cell. The water flow through the trap and into the cell terminates when the pressure of air trapped within the device equals the water supply pressure, causing the supply water to bypass the trap and be routed from the device via a water outlet to the next serially connected such device an another battery cell.

The water pressure inside the trap when water flow through the trap ceases is related to the water supply pressure, which is regulated by a pressure control valve installed between a water inlet of the device and a water source. Because the shut-off water pressure in the trap is a function of the inlet water pressure, the electrolyte level that is provided by the device is pressure sensitive, i.e., the electrolyte level in each electrolytic cell varies depending on the inlet water pressure that the device sees. For this reason it is necessary that the pressure control valve be used to fix the inlet water pressure to a desired constant value that provides a desired electrolyte level.

U.K. Patent No. 1,041,629 discloses another "trap-type" device that is very similar to the trap-type device described above, in that the device makes use of a water trap to control the dispensement of water into an electrolytic cell. The device operates using the same principles of operation as the other trap-type device and is constructed to provide an electrolyte level within the cell that is sensitive to the water supply pressure.

The above-described trap-type devices are adapted to be hydraulically connected in series with identical such devices that are installed in other electrolytic cells to provide serial battery leveling and replenishment. However, because the inlet water pressure to each device determines electrolyte level in each cell, the pressure losses that occur through the series arrangement of devices can cause the electrolyte level to be progressively lower in each sequentially arranged cell, making accurate electrolyte leveling in each cell difficult. Additionally, such trap-type devices are constructed so that once the desired cell electrolyte level is achieved, and gas that is produced within the cell is prohibited from exiting the cell, thereby creating a potential explosion hazard.

Although the above-described trap-type devices do permit electrolyte leveling and replenishment without circulating electrolyte between electrolytic cells and away from the battery, and without the use of moving parts, the ability of such devices to do so is dependent on the inlet pressure of the water, thereby making such devices unsuited for use in applications where precise water pressure regulation is not available and/or practical.

Additionally, the described trap-type devices are not capable of operating under vacuum conditions, e.g., where a differential pressure through the device is created under vacuum rather that positive pressure operating conditions. The ability to perform electrolyte leveling and replenishment using a vacuum induced differential pressure through the device is desirable because it eliminates the possibility of water leakage occurring outside of the battery, which may be caused by leaking connection tubing or the like.

It is seen, therefore, that a need exists for a device which has some of the following characteristics: it permits electrolyte leveling and electrolyte replenishment for electrolytic cells of an electrolyte battery from a single point, i.e., from a single connection point with a water source; it is capable of both replenishing an electrolytic cell with water to a determined electrolyte level and circulating water, not electrolyte, through the device to one or more other devices that are installed in respective cells once its own cell is filled; it has no moving parts and can provide electrolyte leveling and replenishment independent of variations in the differential pressure within the device; and it can be used in either positive pressure or vacuum operating conditions.

SUMMARY OF THE INVENTION

This invention addresses and fulfills the needs identified above. It does so economically, simply, efficiently and reliably.

Generally speaking, this invention comprises a device that permits the replenishment of one or more electrolytic cells of an electrolyte battery with water to a determined electrolyte level without the use of moving parts, without the need for electrolyte circulation outside of the battery, in a manner that is independent of water supply pressure, by creating a pressure differential within the device by either pressure or vacuum operating conditions. An exemplary embodiment of the device comprises a body having a chamber therein, and having first and second water ports that extend through the body into the chamber. The first and second water ports can be used interchangeably as either water inlet or water outlet ports.

The device body also includes first and second water passages that are independent of one another that extend axially in the annular chamber, that are in hydraulic connection with respective first and second water ports, and that have lower ends in the cavity below the ports. Water entering the device via one of the water ports travels axially in the device via a respective water passage.

A trap is disposed within the device body and has an inlet bowl at a position below the lower ends of the first and second water passages. Water passing through one of the water passages passes into the trap. The trap includes first and second weirs disposed therein. A bell chamber is disposed within the body adjacent an outlet of the trap. Water passing the weirs of the trap enters the bell chamber and is passed therethrough out of an open end of the bell chamber and into the electrolytic cell.

The trap and bell chamber are defined to trap a volume of air therein when the surface of the electrolyte in the electrolytic cell meets the bell chamber open end. As water continues to pass through the device and into the electrolytic cell, the trapped air becomes pressurized by electrolyte rising in the bell chamber. The flow rate of water through the trap is reduced as pressure of trapped air begins to approach the head pressure of water in the device caused by the level of water therein. The trap and bell chamber are designed so that water flow through the trap to the electrolytic cell terminates, and the determined electrolyte level within the cell is achieved, at the point where the pressure of trapped air at least equals the head pressure of water in the bowl. The device may be configured to include a gas vent for releasing gas pressure from the electrolytic cell to the atmosphere, or to collection for further treatment, after the watering cycle.

The device is operated by imposing a pressure differential between water inlet and outlet passages of sufficient amount to effect water flow into the device from a water source connected to the device. The pressure differential can be imposed by either positive pressure or vacuum operating conditions. The device can be embodied to either fit within an electrolyte fill opening in an electrolytic cell, to facilitate retrofit application with an existing electrolyte battery, or as an integral part of a new battery construction.

Liquid filling devices of this invention can be hydraulically connected together for use in an electrolyte replenishment and leveling system for filling a respective number of electrolytic cells. An advantage of using such device in such system is that it simplifies the replenishment and leveling of multiple electrolytic cells by allowing such operation to be conducted from a single location, i.e., a single connection with a water source, without the need to gain physical access to each cell.

Broadly stated, a structural embodiment of the invention can comprise a body that defines first and second water flow ports, and a trap that has a bowl located below the water ports. The body also includes first and second water passages that separately connect respective ports to the bowl for ingress and egress of water to and from the bowl. The trap has a discharge weir lip between the bowl and an outlet from the trap located below the lip at a location a selected distance below a desired liquid level to be established in a chamber to which the outlet is connectable. The trap has an outlet that is located vertically relative to the lip and the lower end of the one of the first and second passages. The volume distribution between such one passage lower end and the trap outlet being defined to cause water flow through the trap to cease after immersion of the trap outlet and after water in the bowl rises to at least the level of the lower end of such one passage.

In broad terms, a procedural embodiment of the invention can include the steps of creating a pressure differential between a water inlet passage and water outlet passage of a liquid filling device, and causing water to pass through a water inlet passage of the device, through a trap of the device, through a bell chamber of the device, and into an electrolytic cell. A volume of trapped air is formed within the bell chamber and trap when the level of electrolyte within the cell reaches an open end of the bell chamber. The volume of trapped air in the device is pressurized by continued passage of water to the electrolytic cell until the pressure of the trapped air at least equals a head pressure of water in the device caused by the level of water in the device. The passage of water into the electrolytic cell is terminated to achieve a determined electrolyte level when the pressure of the trapped air at least equals a head pressure of water in the device. The determined electrolyte level is achieved independent of the pressure of water entering the device.

BRIEF DESCRIPTION OF THE DRAWINGS

The above-mentioned and other features of this invention are set forth in the following detailed description of the presently preferred and other embodiments of the invention, which description is presented with reference to the accompanying drawings wherein:

FIGS. 1–9 are sequential, cross-sectional elevation, schematic views of a simplified exemplary watering device, illustrating principles of this invention, at successive stages in practice of the procedural aspects of this invention; more specifically, FIG. 1 illustrates placement of a watering device within a head space of an electrolytic cell having a less than full electrolyte level and at time before commencement of an electrolyte replenishment operation;

FIG. 2 illustrates commencement of the electrolyte replenishment operation where water is introduced into the device and is passed to a trap bowl of the device;

FIG. 3 illustrates the filling of the bowl to a water level equal to a lip height of an exit weir of the device;

FIG. 4 illustrates the passage of water from the bowl, over the exit weir lip, through a bell of the device, and into the electrolytic cell;

FIG. 5 illustrates passage of water through the trap into the electrolytic cell at a time when the electrolyte level in the cell is raised to a mouth of the bell, forming an air pocket within the bell;

FIG. 6 illustrates further passage of water into the electrolytic cell, causing the electrolyte level to be raised above the bell mouth and increasing the pressure of air trapped within the air pocket;

FIG. 7 illustrates the continued filling of the bowl and passage of water into the electrolytic cell, causing water in the bowl to be raised to an open end of a water outlet passage of the device for flow from the device;

FIG. 8 illustrates the continued filling of the bowl and rising of the electrolyte level in the cell to a point where a determined electrolyte level is achieved, water flow into the cell is terminated, and water entering the bowl is passed from the bowl through the water outlet passage;

FIG. 9 illustrates completion of the electrolyte replenishment operation after the determined electrolyte level is achieved, and after a purging process is completed;

DETAILED DESCRIPTION

Figure 3:
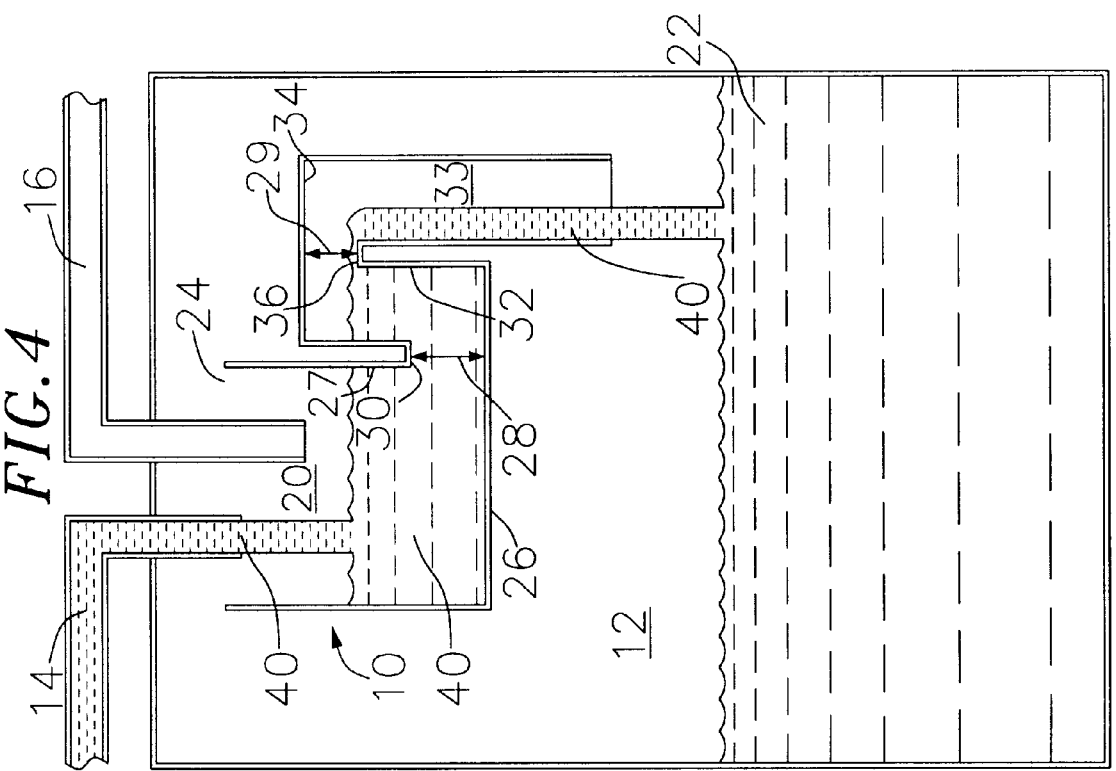

Liquid filling devices (LFDs) of this invention operate under principles of hydraulic pressure differentials to provide electrolyte leveling and electrolyte replenishment for one or more electrolytic cells in an electrolyte battery. Generally speaking, LFDs of this invention are disposed within a head space of an electrolytic cell and provide electrolyte leveling and replenishment without circulation of battery electrolyte, without the use of moving parts and in a manner that produces a determined electrolyte level that is independent of the pressure or vacuum conditions that are used to create a pressure differential in the LFD for introducing water into the device and into the adjacent cell.

FIG. 1 illustrates in schematic form the fundamental structural features of LFDs 10 constructed according to principles of this invention. It is to be understood that the LFD illustrated in FIGS. 1–9 is presented in simplified form for purposes of clearly illustrating the operating principles of LFDs constructed according to principles of this invention. LFDs of this invention are installed within a head space of an electrolytic cell 12 of an electrolyte battery, i.e., above the electrolyte surface and below an electrolytic cell cover. The LFD illustrated in FIGS. 1–9 is shown disposed completely within the electrolytic cell for purposes of simplicity. An LFD of this invention can be constructed to fit through an electrolyte fill opening in the cell cover of an existing electrolyte battery, or it can be constructed as an integral part of the battery, e.g., constructed as a part of the cell cover itself.

The LFD comprises a water inlet passage 14 that extends through the LFD body or battery cell cover, whichever the case may be, depending on whether the LFD is configured as a device adapted for retrofit use with existing electrolytic cells, or whether the LFD is configured as an integral member of the electrolytic cell of a new battery, as will be better described below. A water outlet passage 16 extends through the LFD body or battery cover. The water inlet passage 14 has a downward leg in the cell to an outlet end 18 that is directed to a bowl 20 of the device that is disposed both above the electrode plates (not shown) of the electrolytic cell, and essentially above the desired level of electrolyte 22 in the cell. The outlet passage 16 has an upward leg in the cell from an inlet end 44 (see FIGS. 1 and 6) located within the height of bowl 20.

The bowl 20 includes a mouth 24 near a top of the device, and a floor 26 near a bottom of the device. The bowl includes and connects to a trap that is defined by a first weir 27 that extends vertically downwardly from the mouth 24 to form a first bowl passage 28 between a first weir lip 30 and the bowl floor 26. As will be discussed below, the placement of the first weir lip 30 within the bowl contributes to the hydraulic operation of the LFD in replenishing electrolyte to a determined level within the cell.

The bowl trap includes a second weir 32 that extends upwardly from the bowl floor 26 and is positioned adjacent the first weir 27. A second bowl passage 29 extends within the bowl from the first weir 27, and is hydraulically connected to a bell chamber 33. The second bowl passage is defined along its top portion by a ceiling 34, and along its bottom portion by a second weir lip 36. As will be discussed below, the placement of the second weir lip 36 contributes to the hydraulic operation of the LFD in replenishing electrolyte to a determined level within the cell. A bell chamber 33 extends downwardly away from weir lip 36 and the LFD body into the electrolytic cell and includes a mouth 38 at an open end opposite the body that is positioned at a desired position in the cell and relative to the other structure of the LFD.

The remaining features of LFDs of this invention are better explained and understood with reference to FIGS. 1–9, which illustrate the simplified embodiment of a LFD of this invention at different times during leveling and replenishing electrolyte in an electrolytic cell.

FIG. 1 illustrates the LFD 10 disposed within a head space of an electrolytic cell 12 that contains battery electrolyte 22 at a less than desired level. In a lead-acid battery, e.g., the low electrolyte level can be the consequence of loss of water from the acid electrolyte. In FIG. 2, water 40 from a suitable water source is introduced into the water inlet passage 14, and is directed therethrough to the LFD bowl 20. The water is introduced into the LFD by a pressure differential that is created between the water inlet and water outlet passages 14 and 16. The pressure differential can be imposed by either positive pressure (e.g., pumping the water through passage 14 at any desired convenient pressure) or vacuum operating conditions (e.g., connecting passage 16 to a source of vacuum) without affecting the leveling and replenishment performance of the LFD. The water that initially enters the bowl is contained therein due to the placement of the second weir 32 within the bowl, preventing the water from being fully emptied into the bell chamber 33.

Figure 4:
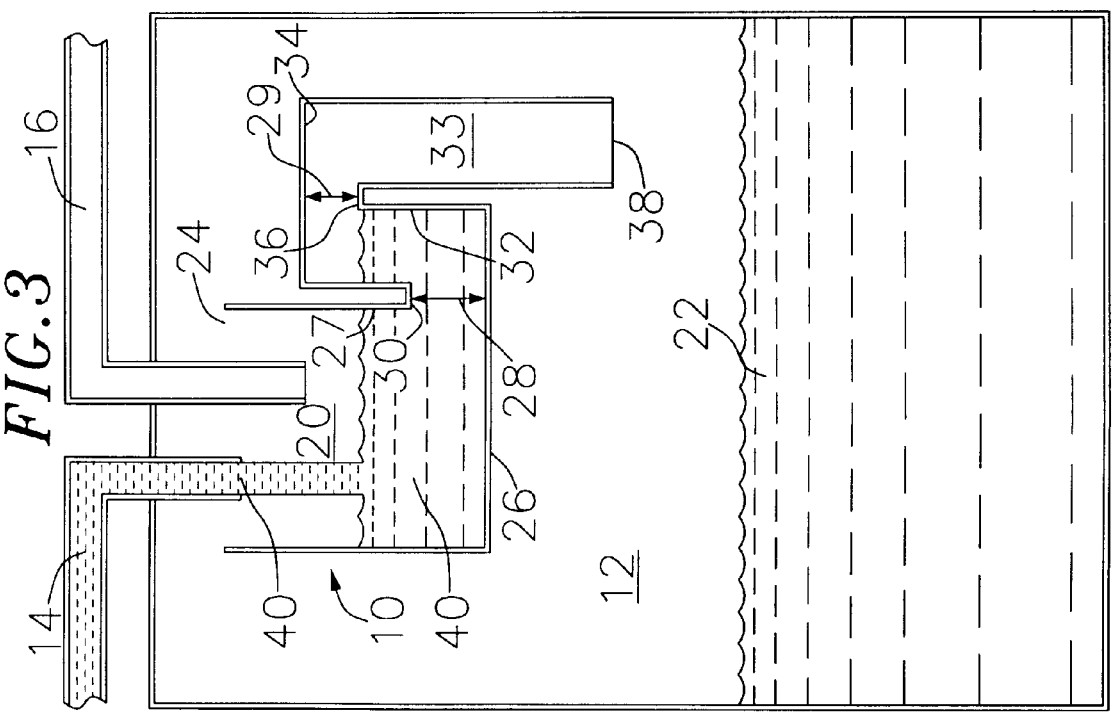

In FIG. 3, the flow of water from the water source, through the water inlet passage 14, and into the bowl 20 is continued, causing the water level within the bowl to rise to a level equal to the edge of the second weir lip 36. As long as the water level in the bowl is below the edge of the second weir lip 36, the water in the bowl will not pass into the electrolytic cell via the bell chamber. In FIG. 4, the flow of water from the water source, through the water inlet passage 14, and to the bowl is continued, causing the water level in the bowl to rise to a level higher than the second weir lip 36. As soon as the water level in the bowl exceeds the height of the second weir lip 36, water is allowed to pass through the second bowl passage 29, into the bell chamber 33, through the bell chamber mouth 38, and into the electrolytic cell 12. The water exiting the bell chamber and entering the electrolytic cell mixes with the electrolyte 22 in the cell and causes the electrolyte level in the cell to rise.

In FIG. 5, the flow of water from the water source, through the water inlet passage 14, through the bowl 20, through the bell chamber 33, and into the electrolytic cell is continued, causing the electrolyte level within the cell to rise to the same level as the mouth 38 of the bell chamber 33. Once the electrolyte level in the cell rises to the bell chamber mouth 38, air 42 that exists within the bell chamber 33 and second bowl passage 29 is trapped therein by the water surface within the second bowl passage 29, at one end, and by the electrolyte surface at the bell chamber mouth 38, at an opposite end. The air 42 that is trapped within the device at the point in time when the electrolyte surface contacts the bell chamber mouth typically is at the same pressure as the internal cell pressure. This is so because the air being displaced within the electrolytic cell during replenishment, by introduction of the water, is allowed to escape from the cell via the water outlet passage 16.

In FIG. 6, the flow of water from the water source, through the water inlet passage 14, through the bowl 20, through the bell chamber 33, and into the electrolytic cell is continued, causing the level of the electrolyte in the cell to rise above the mouth 38 of the bell chamber 33. As the electrolyte level in both the cell and the bell chamber rises above the mouth 38, the pressure of the trapped air 42 within the bell chamber 33 increases, imposing a pressure on the surface of the water in the second bowl passage 29. The pressure imposed on the surface of the water in the second bowl passage causes the water level therein to be lowered towards the lip 36 of the second weir 32, thereby reducing the rate of water passage to the bell chamber 33. This is so because the pressure of the trapped air 42 within bell chamber begins to approach the head pressure associated with the water level in the bowl. It is important to note that the water pressure within the bowl is produced by the level of water within the bowl, and is independent of the supply pressure of water entering the LFD. As the pressure of the trapped air rises, the water level in the bowl also begins to rise toward an open end 44 of the water outlet passage 16.

In FIG. 7, the flow of water from the water source, through the water inlet passage 14, through the bowl 20, through the bell chamber 33, and into the electrolytic cell is continued, causing both the electrolyte level in the cell to rise and the water level in the bowl 20 to rise to the point where the water surface contacts the open end 44 of the water outlet passage 16. While the open end 44 of the water outlet passage 16 is shown in FIGS. 1–9 as being below an open end of the water inlet passage 14 for purposes of simplicity and of illustration, it is to be understood that the open ends of the water inlet and outlet passages can be positioned at equal levels within the device in the bowl without affecting the leveling and replenishment operation of the LFD.

What occurs once the water level in the bowl reaches the open end 44 of the water outlet passage 16 depends on whether the pressure differential within the LFD is created by pressure or vacuum operating conditions. Under vacuum operating conditions, the water inlet passage 14 is connected at an inlet end 46 to a non-pressurized water source (not shown). The water outlet passage 16 is connected at an outlet end 48 to a vacuum source (not shown), and a vacuum is imposed on the water outlet passage. As the air in the cell 12 is evacuated, water 40 is drawn through the water inlet passage 14 and into the cell in the manner described above. Once the water level in the bowl 20 reaches the open end 44 of the water outlet passage 16 it is picked up by the vacuum in the passage and is drawn therethrough. As water movement through the water outlet passage 16 continues, water continues to enter the cell via the water inlet passage 14, and water continues to enter the cell via flow through the bell chamber 33.

The LFD is designed to stop water flow from the bowl 20 into the cell 12 after a determined or desired electrolyte level is achieved. Specifically, the first and second weir lips 30 and 36 and the open end 44 of the water outlet passage 16 are located within the bowl 20 so that, when the determined level of electrolyte in the cell is reached, the trapped air 42 is pressurized by an amount sufficient to impose an equalization pressure on the surface of the water in the second bowl passage 29. The LFD is designed so that the equalization pressure causes both the water level within the second bowl passage 29 to be moved to a location at or below the second weir lip 36, thereby terminating further water passage from the bowl 20 through the bell chamber 33, and causing the water level in the bowl to rise to the open end 44 of the water outlet passage 16, thereby allowing water still entering the bowl to be removed from the LFD 10, i.e., to flow through the LFD without entering into the electrolyte space of the cell. Once the LFD reaches its equalization pressure, i.e., the desired cell electrolyte level is achieved, the flow rates of water passing into and out from the LFD reach equilibrium, and the LFD performs a water circulating rather than an electrolyte replenishing function.

Under positive pressure operating conditions, the water inlet passage 14 is connected at its inlet end 46 to a pressurized water source. The outlet end 48 of the water outlet passage 16 is at atmospheric pressure. As water enters the LFD, it fills the bowl 20 and electrolytic cell 12 with water as described above. Once the water level in the bowl 20 reaches the open end 44 of the water outlet passage 16, the water level in the bowl continues to rise until the pressure of the trapped air 42 reaches the equalization pressure, where the water in the second bowl passage 29 is moved below the second weir lip 36. At this point, the water level in the bowl is sufficient to effect water passage from the bowl through the outlet water passage 16. Like the vacuum operated system, once the LFD reaches its equalization pressure the desired cell electrolyte level is achieved, the flow rates of water passing into and out from the LFD reaches equilibrium, and the LFD performs a water circulating rather than an electrolyte replenishing function.

A feature of LFDs of this invention is that they are designed to provide a desired electrolyte level within the cell by either a pressure or vacuum induced pressure differential, and are designed provide such electrolyte level independent of the particular operating pressure or vacuum conditions that are used.

Referring to FIG. 8, the LFD 10 is illustrated at a point where the equalization pressure between the pressure of the trapped air 42 and the head pressure of the water in the bowl has been achieved, and the pressure of the trapped air 42 in the second bowl passage 29 and the bell chamber 33 has caused the water level in the second bowl passage to be moved sufficiently relative to the second weir lip 36 to terminate water passage into the bell chamber 33. Equilibrium has also been achieved in the bowl 20 so that the rate of water entering the bowl is equal to the rate of water routed from the LFD via the outlet water passage 16. At this point, the electrolyte leveling and replenishment is complete.

Depending on the particular application, the LFD may be used to fill a single electrolytic cell, in which case the water routed from the cell can be collected in a water reservoir or the like, and the water flow into the cell can be terminated after water flow is detected from the outlet water passage 16. LFDs constructed according to principles of this invention, can be used to fill a number or plurality of electrolytic cells in an electrolyte battery. In such application, one LFD is installed into each electrolytic cell and the water inlet and outlet passages of each LFD are hydraulically connected to permit leveling and replenishment of multiple electrolytic cells in series and/or parallel. An exemplary system for leveling and replenishing electrolyte in multiple electrolytic cells is better described below with reference to FIG. 17.

Referring to FIG. 9, after the process of electrolyte leveling and replenishment is completed and the introduction of water into the LFD is terminated, it may desired that the water inlet passage 14 and water outlet passage 16 be cleared of any remaining liquid, e.g., water trapped within the water inlet and outlet passages that extend between hydraulically connected LFDs. Purging water from the water inlet and outlet passages is desired because it prevents the passage of water between the electrolytic cells and ultimately from the battery during battery discharge or charging due to pressure being built up within each cell. Gas pressure within each cell is known to increase during the charging process due to the liberation of gas (hydrogen and oxygen), i.e., outgassing from the electrolyte, which can cause liquid disposed within the water inlet and outlet passages to travel through hydraulically connected electrolytic cells, and ultimately out of the battery.

The water inlet and outlet passages 14 and 16 are purged by either: (1) passing air through the water inlet passage 14, causing liquid contained in each water outlet passage to be passed therethrough until the water level in the bowl 20 moves below the open end 44 and air is passed therethrough; (2) passing air through the water outlet passage 16, causing liquid contained therein to be reverse purged into the bowl 20 until air passes therethrough; (3) inducing a vacuum on the water inlet passage 14, causing water contained within the water outlet passage to be reversed purged into the bowl; or (4) inducing a vacuum on the water outlet passage 16, causing the water contained therein to be pulled therethrough until the water level in the bowl 20 moves below its open end 44 and air is passed therethrough.

Referring to FIGS. 10–15, a presently preferred LFD 54, constructed according to principles of this invention, generally comprises the same structural features described above for the simplified LFD 10 illustrated in FIGS. 1–9, and has been configured to enable its placement (see FIG. 19) within an electrolyte fill opening of an electrolytic cell. LFD 54 is formed from a multi-piece construction comprising, moving from an uppermost end of the device downward: a LFD cap 56; a LFD upper body part 58 disposed below the cap 54 and attached thereto at an open top end 60 of part 58; a lower body part 62 attached to a bottom open end 64 of part 58; and a trap and bell chamber body 66 attached to a bottom end 68 of body part 58. Elements 56, 58, 62 and 66 are generally round, are coaxially aligned, and are interconnected at their rims.

The overall configuration of LFD 54, except for the duct connection nipples which preferably extends laterally from the LFD and which define passage ports 70 and 72, is circularly cylindrical with appropriate external features that enable it to be secured in a water fill port of an existing battery, such as a lead-acid battery.

Generally speaking, water enters the LFD upper body 58 through either one of two water ports 70 and 72 and is routed through the LFD body 58, through a trap formed by body part 62 and bell chamber body 66, and into the electrolytic cell. The LFD is constructed to provide electrolyte leveling and replenishment according to the hydraulic principles described above and illustrated in FIGS. 1–9. LFD 54 is designed to accommodate water flow through either one of its water ports 70 and 72, thereby simplifying its hydraulic connection.

Figure 10:
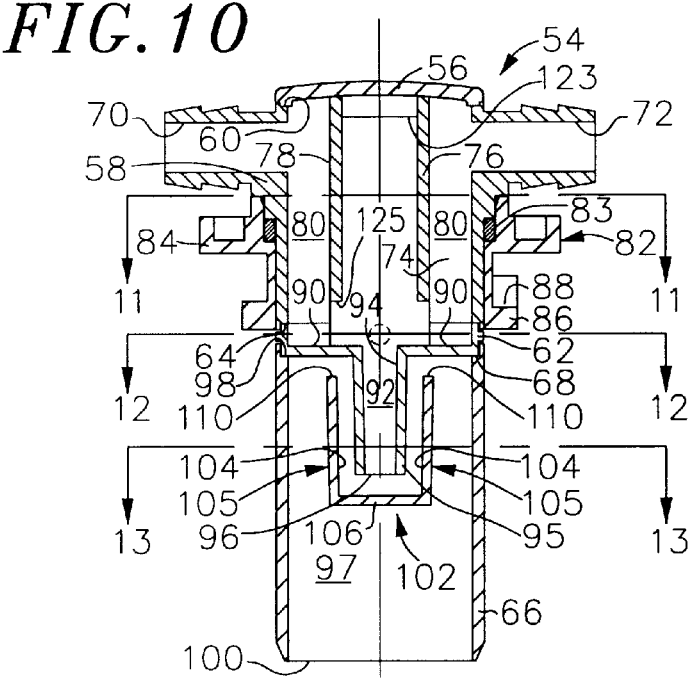
FIG. 10 is a cross-sectional elevation view of a first embodiment of the device, constructed according to principles of this invention, adapted for attachment within an electrolyte fill opening in an electrolytic cell.
Figure 11:
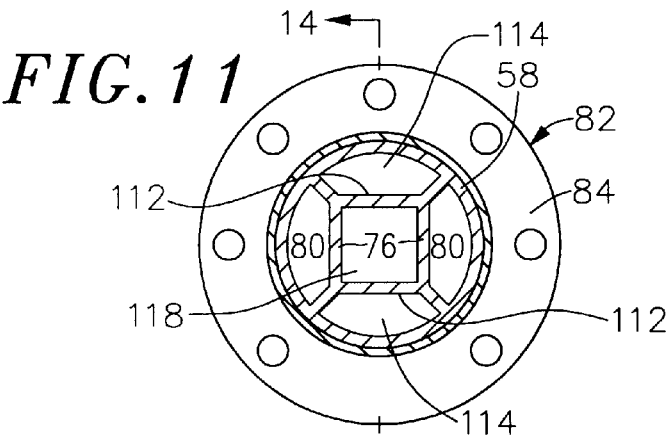
FIG. 11 is a sectional view the device of FIG. 10 taken along line 11—11 in FIG. 10.

Referring to FIGS. 10 and 11, the LFD 54 is generally cylindrical in shape to permit installation within an electrolyte fill opening of an electrolytic cell. The upper body 58 includes a water chamber 74 extending therethrough from its first (top) open end 60 to its second (bottom) end 64, and water ports 70 and 72 positioned adjacent the first end 60 that each extend radially outwardly therefrom. Water ports 70 and 72 preferably extend from the LFD body 58 at diametrically opposed locations. Two vertical spaced water baffles 76 are disposed within the chamber and are each oriented having a front side surface 78 perpendicular to a respective water port. Each water baffle 76 is connected along its lengthwise edges to an interior wall surface of the upper body part 58, forming a pair of diametrically opposed vertical water passages 80 that are each disposed between a baffle front side surface 78 and an adjacent body wall surface. Each water passage 80 extends downwardly from a respective water port 70 or 72 to the (lower) second end 64 of the upper body.

As FIG. 10 illustrates, the LFD body 58 is symmetric in cross section about a vertical central axis. As will be discussed below, with reference to FIG. 14, the LFD 58 also includes vertical gas baffles 112 that are positioned within the chamber 74 perpendicular to the water baffles 76.

The LFD 54 includes means for providing releasible attachment with an electrolyte fill opening of an electrolyte battery. In a preferred embodiment, such means is in the form of a collar 82 that is disposed circumferentially around the LFD body 58, and that extends axially along the body between the water ports 70 and 72 and the LFD body second end 64. An O-ring seal 83 is disposed circumferentially around an outside surface of the LFD body 58 and is interposed between the collar 82 and the LFD body to form a gas and liquid-tight seal therebetween. The collar 82 can either be attached around the LFD body by interference fit or by other connection means, such as by adhesive bonding, ultrasonic bonding, or the like; it is preferred, however, that the body be rotatably carried in the collar.

In the preferred arrangement shown, the LFD 54 is disposed coaxially through the collar 82 and is both sealed and held in place inside of the collar by a tight fit provided by the O-ring seal 83. Attaching the LFD 54 to the collar in this manner permits the LFD to be rotated within the collar, to accommodate routing of any external plumbing and the like, without upsetting the attachment and seal formed between the collar and the cell fill opening. As will be discussed in greater detail below, the assembled LFD 54 is inserted into the collar 82 after the collar has been engaged within an electrolyte fill opening of an electrolytic cell.

The collar 82 is adapted to facilitate releasible attachment with an electrolyte fill opening of an electrolytic cell, and includes a first flange 84 that extends radially away from the one axial end of the collar and is positioned adjacent the water ports 70 and 72. The first flange 84 is sized to have a diameter greater than that of the electrolyte fill opening to limit an insertion depth of the LFD into the electrolytic cell. Additionally, the first flange can have an external shape designed to fit a hand or other type of tool conventionally used for rotating a member. Configured in this manner, the first flange accommodates the use of such tool to install and rotate the collar into place within the electrolytic cell opening.

The collar 82 also includes two lower second flanges 86 that extend radially away from an opposite axial end of the collar adjacent the second end 64 of upper body 58. The second flanges 86 are located at diametrically opposed locations on the collar and extend partially (preferably about 90 degrees) about the circumference of the collar, and are sized for installation within the electrolyte fill opening. The upper surface 88 of each flange 86 is helically sloped in a way that is designed to provide a releasible interlocking fit with a complementary helically sloped surface defined on the bottom surface of a ledge 170 which extends from the outer diameter of an electrolyte fill opening 171 defined in a battery cover 172; see FIG. 19. These are two diametrically opposed ledges at the fill opening and each extends partially (preferably about 90 degrees) about the opening. The collar 82 is designed to provide a releasible interlocking fit within the electrolyte fill opening by inserting the second flange 86 therein so that the first flange 84 is placed against a top surface of the battery cell, e.g., the battery cover, and rotating the LFD 54 within the opening a determined amount (preferably 90 degrees) to cause a camming (threading) cooperation between flanges 86 and the fill opening ledges 170 which cause upper circumferential collar flange 84 to seat and seal against the battery cover surface about the electrolyte fill opening.

Figure 14:
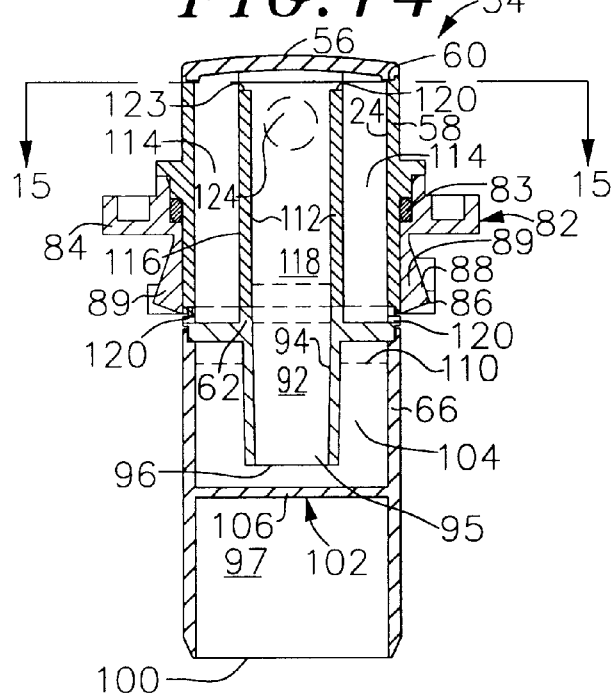
FIG. 14 is a cross-sectional elevation view of the device of FIG. 10 rotated by 90 degrees, i.e., a view taken along line 14—14 in FIG. 11.

The collar also preferably includes two movable members 89 (one such member can be used) in the form of a tab that is integral with a side wall portion of the collar, as illustrated in FIG. 14. The tab is designed having an outer surface that is planar with an outside diameter of the collar, and having an inside surface that extends radially inwardly from an inside diameter of the collar, when the LFD 54 is not disposed within the collar. Upon insertion of the LFD 54 into the collar 82, the tab is forced by cam action to move radially outward so that its outer surface projects a distance away from the collar outside diameter.

Figure 19:
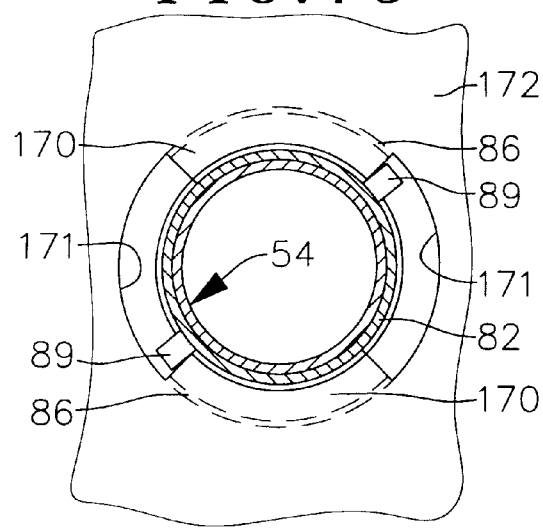
FIG. 19 is a cross-sectional plan view depicting the device shown in FIGS. 10–15 as mounted in a water fill port of a battery.

The tab is positioned along the collar so that, when the LFD 54 is installed within the collar which has been mounted in a battery fill opening, the tab projects into the fill opening tongue and groove arrangement to abut against an adjacent end of the fill opening ledge to lock the collar into its fully rotated position within the fill opening. Such locking engagement of the collar within the opening is important to prevent the collar from being rotatably moved and loosened within the fill opening, thereby ensuring that a gas- and liquid-tight seal between the collar and fill opening is maintained. Such a seal is important for allowing watering under vacuum operating conditions. In a preferred embodiment, the collar comprises two tabs 89 that are positioned diametrically opposed from one another to engage diametrically opposed complementary portions of the fill opening, as shown in FIG. 19.

The collar may include one or more washers (not shown) disposed circumferentially therearound between the first and second flanges to facilitate achieving a gas and liquid-tight seal against the outside surface of the battery cover.

Although a particular means for providing releasible interlocking LFD attachment with an electrolyte fill opening of an electrolytic cell has been described and illustrated, it is to be understood that other attaching means known in the art for accomplishing the same can be used and are intended to be within the scope of this invention.

Figure 12:
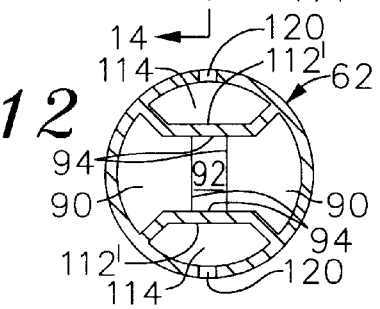
FIG. 12 is a sectional view taken along line 12—12 in FIG. 10.
Figure 13:
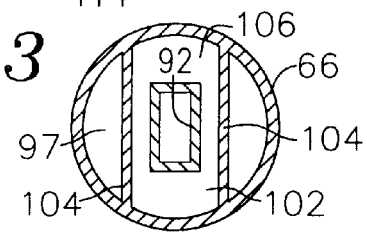
FIG. 13 is a sectional view taken alone line 13—13 in FIG. 10.

The LFD lower body part 62 (also referred to as a weir body because it defines a structure which corresponds to a first weir lip 30 shown in FIGS. 1–9) is attached to the second end 64 of, and has the same outside diameter as, the LFD upper body 58. Referring to FIGS. 10 and 12, the weir body 62 includes a pair of solid sections 90 that each extend in a horizontal direction radially across the diameter of the weir body from diametrically opposed body edges, wherein the solid sections 90 each form a floor portion for a respective water passage 80 through the LFD. Stated differently, solid sections 90 of the lower body part form the floor of a bowl which extends in the LFD upwardly to parts 70 and 72, and passages 80 extend downwardly from those parts into the bowl. The body 62 includes a centrally located passage 92 that extends axially therethrough a distance downwardly from the solid sections 90. The passage 92 is defined vertically by wall surfaces 94 that form a first weir 95. In an exemplary embodiment, the weir body passage 92 has a rectangular cross sectional shape, as best seen in FIGS. 12 and 13. The first weir 95 includes a first weir lip 96 at its open end that extends a determined distance into a central passage 97 in an upper portion of the bell chamber body 66.

Referring to FIGS. 10 and 13, the bell chamber body 66 is generally cylindrical and has a diameter that preferably is approximately equal to that of the LFD body parts 58 and 62. The bell chamber body 66 has a passage 97 that extends axially therethrough from a first body end 98, attached to weir body 62, to a second lower open end or mouth 100. For purposes of reference, the bell chamber annular passage 97 shall be referred to as the bell chamber. The bell chamber 97 includes a water reservoir 102 disposed therein that is defined vertically by a pair of diametrically opposed side walls 104, that each extend axially along the bell chamber a determined length, and that are attached along lengthwise edges to a wall surface of the bell chamber body. The side walls 104 have upper ends 110 located below solid sections 90 of body part 62 to form a second weir 105; compare second weir wall 32 shown in FIG. 1. The reservoir is defined horizontally by a floor 106 that extends between the lower ends of the side walls 104, and that has lengthwise edges that are attached thereto. The floor 106 has widthwise edges that are attached to the wall surface of the bell chamber 96.

The water reservoir 102 is designed to accommodate placement of the weir body passage 92 therein, so that the first weir lip 96 is positioned a determined distance above the reservoir floor 106, and so a second weir lip 110 (defined at the top edges of walls 104) is disposed a determined distance below the weir body solid sections 90, and a determined distance above the first weir lip 96. Together, the first weir 95 and the second weir 105 form a trap disposed within the LFD 54 in the bottom of the bowl below ports 70 and 72. The water reservoir floor 106 is disposed a determined distance above the bell chamber mouth 100 to produce a desired volume of trapped air therein during electrolyte leveling and replenishment operation of the device.

The LFD 54 is constructed to permit unidirectional water flow therethrough using either water port 70 or 72 as the water inlet. Water is introduced into the LFD 54 by a creating a differential pressure between the water ports 70 and 72, by either pressure or vacuum operating conditions. Water entering the LFD passes from the inlet port through a respective vertical water passage 80 in the LFD body chamber 74, into the LFD trap, through the weir body central water passage 92, past the first weir lip 96, and is directed upwards by the second weir 105. The water passes over the second weir lip 110, through the bell chamber 97, and into the electrolytic cell where it mixes with and replenishes the existing electrolyte.

The LFD 54 functions in the same manner as that previously described above for the simplified arrangement illustrated in FIGS. 1–9. When a determined electrolyte level within the cell is achieved, the pressure of air trapped within the bell chamber and trap imposes an equalization pressure onto the surface of the water disposed between the first and second weirs that is equal to or greater than the head pressure of water within the LFD body 58 associated with the water level in the bowl of the LFD. Pressurizing the air trapped within the bell chamber causes the water disposed between the first and second weirs to be at or below the second weir lip 110. Once the pressure of the trapped air is at or above the pressure head of water in the LFD body, water flow to the cell is terminated.

In the LFDs described and shown, water cannot flow out of the device without flowing into the bowl. The only path for the flow of water from the device into its outlet is via the bowl with which the trap is located. That path has a downwardly excursion between its inlet and outlet ports, and the bowl is a part of that flow path in that excursion. The trap functions as a valve which has no moving parts and which responds to the level of electrolyte in the adjacent battery cell to regulate whether inlet water flows only to the cell, or to the cell and also out of the LFD, or only out of the LFD.

Figure 15:
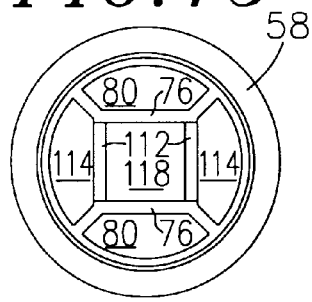
FIG. 15 is a section plan view of the device taken across section 15—15 in FIG. 14.

FIG. 14 shows the LFD 54 of FIG. 10 in a section plane which is perpendicular to the section plane used in FIG. 10. FIG. 14 shows the gas distribution structure of LFD 54. A pair of gas baffles 112 are disposed axially within the LFD chamber 74 and extend from a position adjacent to and slightly below the LFD upper body first end 60 to the weir body 62. Walls 112 have continuations 112' in lower body part 62 which extend those walls to solid sections 90, i.e., to the bottom of the water bowl in the LFD. Referring to FIGS. 14 and 15, the gas baffles 112 are positioned perpendicular to, and are attached along lengthwise edges between, the water baffles 76; see FIG. 11. A pair of gas passages 114 are each formed within the chamber 74 between a front side surface 116 of each gas baffle 112 and a respective adjacent chamber wall surface. A central passage 118 is formed along the central axis of chamber 74 between the inner (back) surfaces of both the water baffles 76 and the gas baffles 112.

The weir body 62 includes one or more vent openings 120 that extend through the walls of the weir body into gas passages 114. In an exemplary embodiment, the weir body 62 includes a pair of vent openings 120 that are diametrically opposed from one another and are formed through the cylindrical wall of the body above body sections 90, which form the floor of the bowl of the LFD. Once the LFD is installed within the electrolyte fill opening of the electrolytic cell, air or gas pressure that is developed within the cell enters into the LFD 54 via the vent openings 120. The entering gas travels from the vent openings 120 upwardly through the gas passages 114 toward the top of the LFD body passage, where the gas travels over top edges 123 of the gas baffles 112 and into the central chamber 118. As will be discussed below, gas entering the central chamber can be routed therethrough and into the water passage 80, where it is vented from the LFD 54.

The LFD cap 56 is generally in the form of a disk. The cap 56 has a diameter that is similar to that of the LFD upper body 58, and is attached along its circumferential edge to the open end 60 of the LFD upper body 58. Gas that has entered the central chamber 118 passes downwardly through the chamber where it passes under the bottom edges 125 of the water baffles 76 and enters one or both of the water passages 80 for removal from the LFD 54 via a water port 72 being used to remove water from the LFD. For example, during a water filling operation that is conducted under either vacuum or positive pressure operating conditions, gas within the central chamber exits the LFD 54 via a water passage 80 that is used to transport water from the LFD 54. Configured in this manner, the LFD prevents pressure from both being built up in the cell during the electrolyte replenishment operation, due to the displacement of air in the cell, and during discharge and charging operations (provided that the water outlet port is not blocked in and is vented to either the atmosphere or to a gas collection unit), which buildup of pressure could cause an explosion hazard when the buildup pressure is caused by liberation of gas from the water component of the electrolyte.

Figure 16:
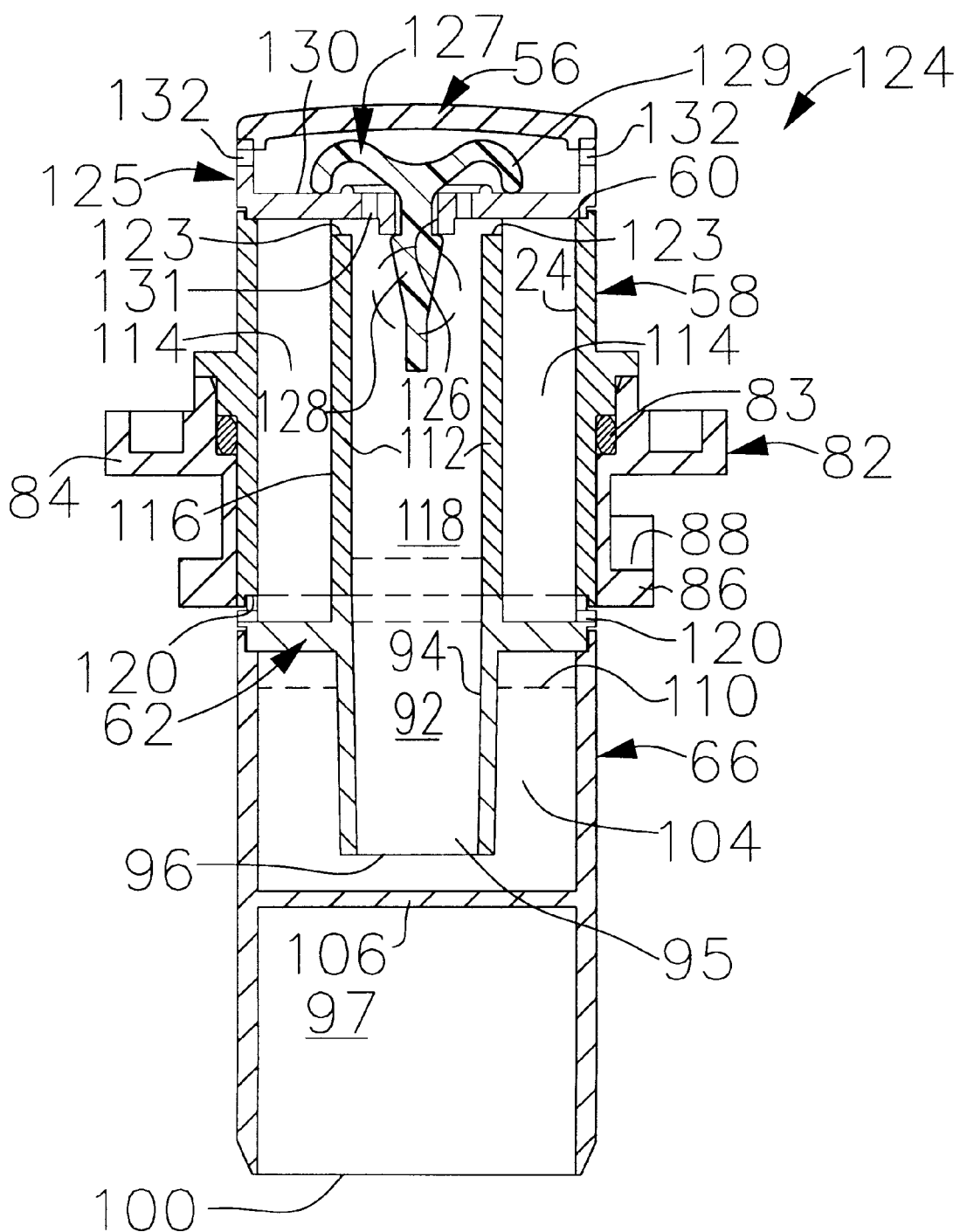
FIG. 16 is a cross-sectional elevation view of a device similar to that of FIG. 14, comprising a checked vent cap arrangement.

FIG. 16 illustrates another preferred embodiment of LFD 124 that is similar to the LFD 54 described above and illustrated in FIGS. 10–15, except that in LFD 124 a valve carrier 125 is interposed between cap 56 and upper LFD body part 58. LFD 124 is configured to allow gas that enters the LFD to be vented therefrom. Valve carrier 125 has a circular disk-shaped configuration and is attached about its circumferential edge to the open end 60 of the LFD upper body 58. The valve carrier has a transverse bottom wall 130 through which are formed a central valve mounting opening 126 in the center of a pattern of gas vent holes 131. The valve carrier also has a side wall that extends around its circumferential edge and in which at least one vent opening 132 is formed. Check valve means 127 is disposed within the central opening 126 to provide a one-way passage of gas from the central chamber 74 through the carrier and to prevent the passage of air from the atmosphere into the LFD. Such checked or one-way gas venting from the LFD is desired to permit use of the device under vacuum operating conditions.

In an exemplary embodiment, the check valve means 127 is in the form of a resilient check valve member or stopper that is disposed above and around the vent holes 131. It is mounted in via a central mounting stem 128. It has a second flared end 129 that cooperates with the top of wall 130 outwardly of the vent holes. The stopper 127 is adapted to provide one-way flow of air or gas from the LFD central gas chamber 118 through vent holes 131, and into the carrier and to prevent the passage of air from the atmosphere, through the carrier and into the central chamber 118.

Gas that has entered the LFD central gas chamber 18 passes through the vent holes 131, past the stopper 127, and through the vent openings 132 to the atmosphere or, alternatively, is collected for further processing and/or eventual routing to the atmosphere. Configured in this manner, the LFD 124 prevents pressure from both being built up in the cell during battery charging or discharging in situations where the water ports to the LFD are blocked and, thus gas is otherwise unable to exit the LFD via the water passages. For example, an LFD comprising such a gas venting cap arrangement can be used to advantage in a battery watering system for a battery-powered golf cart where an off-board reservoir is used and the water inlet and outlet conduits to the battery LFDs have check valves which close when the conduits are disconnected from the water source, thereby to prevent water leakage when the conduits or hoses are disconnected from a watering station.

The above-identified members forming LFDs 54 and 124 can be made from any structurally suitable material that is adapted to withstand the hostile environment of battery service. For example, the LFD may be made from suitable polymeric or fluoropolymer materials that are known to exhibit a good degree of structural rigidity and that provide a good degree of good corrosion and/or chemical resistance, including resistance to nascent oxygen. The members that are used to form the LFDs can be either machined or molded. In an exemplary embodiment, the LFD upper body 58, LFD cap 56, carrier 133, weir body 62, bell chamber body 66, and collar 82 are each molded from a rigid battery grade polypropylene, and are attached together using conventional attachment methods. The valve stopper 127 and O-ring 83 are each formed from a material that both possesses the desired elastomeric properties that are called for in the particular application, and that is adapted to withstand the hostile environment of battery service. In a preferred embodiment, the stopper and O-ring are formed from EPDM rubber.

Figure 17:
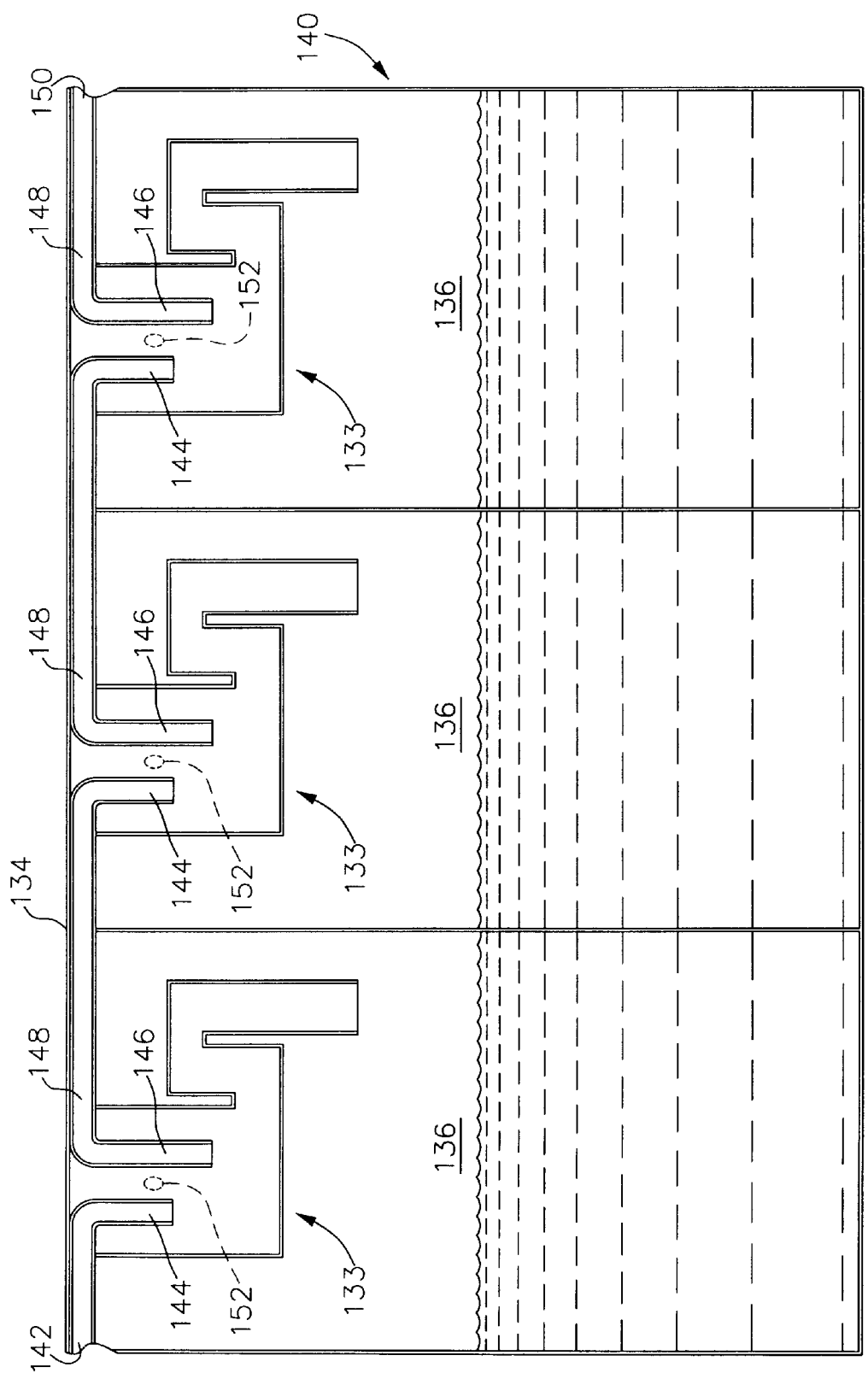
FIG. 17 is a perspective view of a second embodiment of the device constructed, according to principles of this invention, as an integral member of the battery cover.

FIG. 17 schematically illustrates another LFD 133 of this invention that is configured as an integral part of the battery structure itself, rather than as a device that is designed for attachment within an electrolyte fill opening of an existing electrolyte battery. For purposes of simplicity and illustration, the simplified form of LFD illustrated in FIGS. 1–9 has been shown in FIG. 16 as an integral member of the battery structure; namely, the battery cover. It is, however, to be understood that the LFDs 54 described above and illustrated in FIGS. 10–16 may also be constructed as an integral member of the battery structure.

LFDs 133 are incorporated in a battery cover 134 that fits over and seals the electrolytic cells 136 of an electrolyte battery 140. The number of LFDs 133 formed in the cover 134 equals the number of electrolytic cells 136, and each LFD is oriented within the battery cover so that it is disposed within a head space of a respective cell. The cover 134 includes a water inlet port 142 that is in hydraulic connection with the water inlet passage 144 of a first LFD. The LFDs are hydraulically connected to one another in series between their water inlet and water outlet passages 144 and 146 via water transport passages 148 disposed within the battery cover. The cover 134 includes a water outlet port 150 that is hydraulically connected to a water outlet passage 146 of a terminal (last) LFD. LFDs 133 also include vent ports 152 disposed within the battery cover to allow for built-up pressure from the cell to be removed therefrom via the LFD as described above for LFD 43., e.g.

It is to be understood that the arrangement of three cells illustrated in FIG. 17 has been selected for purposes of simplicity of illustration and reference, and that LFDs of this invention can be configured as integral components of a battery having any number of electrolytic cells. It is also to be understood that the particular construction of the LFDs as being integral with the battery cover is but one method of making the LFDs as part of the battery, and that other constructions, e.g., making the LFD integral with the electrolytic cell wall, are intended to be within the scope of this invention.

LFDs constructed as integral members of an electrolyte battery, rather than as separate devices that are adapted for retrofit through the electrolyte fill openings of an electrolyte battery, are desired because only one water source coupling and water outlet coupling is needed to effect electrolyte leveling and electrolyte replenishment for all of the battery cells, thereby further simplifying the electrolyte leveling and replenishment operation. Also, avoiding the need to retrofit LFDs into each electrolytic cell both eliminates having to fabricate and maintain external plumbing between the LFDs, thereby easing battery maintenance and avoiding potential sources of water leakage outside of the battery, and avoids any spatial concerns that may be associated with using add-on LFDs with existing batteries in certain space-tight applications.

A feature of LFDs of this invention is that, when installed into each electrolytic cell of the battery and when hydraulically connected together, the process of electrolyte leveling and replenishment is reduced to a simple act of making a single connection with a water source, creating a pressure differential within LFDs, and waiting until water passes from the terminal LFD. Using LFDs of this invention avoids the need to gain physical access to each cell for electrolyte leveling and replenishment, and avoids the need to circulate electrolyte outside of the battery, thereby eliminating a potential source of property damage or health risk.

Another feature of LFDs of this invention is that the operation of electrolyte leveling and replenishment is accomplished without the use of moving parts in or at a battery. The use of moving parts in battery service is not desired due to the hostile environment with which the parts may come into contact. The use of moving parts in such a hostile environment is known to result in the failure of the parts and/or the improper operation of such parts, in either case impairing the proper operation of the device.

A further feature of LFDs of this invention is that they permit electrolyte leveling and replenishment under a wide range of differential pressure conditions that can be imposed under either pressure or vacuum operating modes. Because LFDs of this invention are designed to provide a determined electrolyte level within a cell, based on the equalizing pressure between the trapped air within the bell chamber and the pressure head associated with the water level in the bowl inside the LFD body, independent of the particular pressure or vacuum operating conditions, their use minimizes or eliminates altogether any effects that inconsistent pressure or vacuum operating conditions could have on the LFDs ability to consistently provide the determined electrolyte level in each battery cell. By using LFDs of this invention, a person carrying out the electrolyte leveling and replenishment operation can be confident that the electrolyte in each cell is replenished to the determined level without having to worry about the specific pressure or vacuum operating condition. Such feature of the invention also makes the leveling process easily adaptable to a variety of different pressure or vacuum sources.

The amount of differential pressure needed to operate LFDs of the invention depends on the particular LFD application and size. For example, LFDs configured and sized to be used with an automobile or golf cart battery could be operated using a smaller differential pressure than that associated with a LFD which has been configured and sized for use with a submarine battery. In an exemplary embodiment, where the LFD is sized for use in an automobile or golf cart application (i.e., where the LFD is in the form of that illustrated in FIGS. 10–16, having a body diameter of less than about one inch to facilitate installation within the electrolytic cell opening) it will enable electrolyte leveling and replenishment under differential pressure conditions (absolute) in the range of from about 0.1 to 20 Psia, without affecting the desired electrolyte level that is provided by the LFD in the cell. It is, however, to be understood that the LFD can be configured and sized to operate under different differential pressure conditions depending on the particular application.

Figure 20:
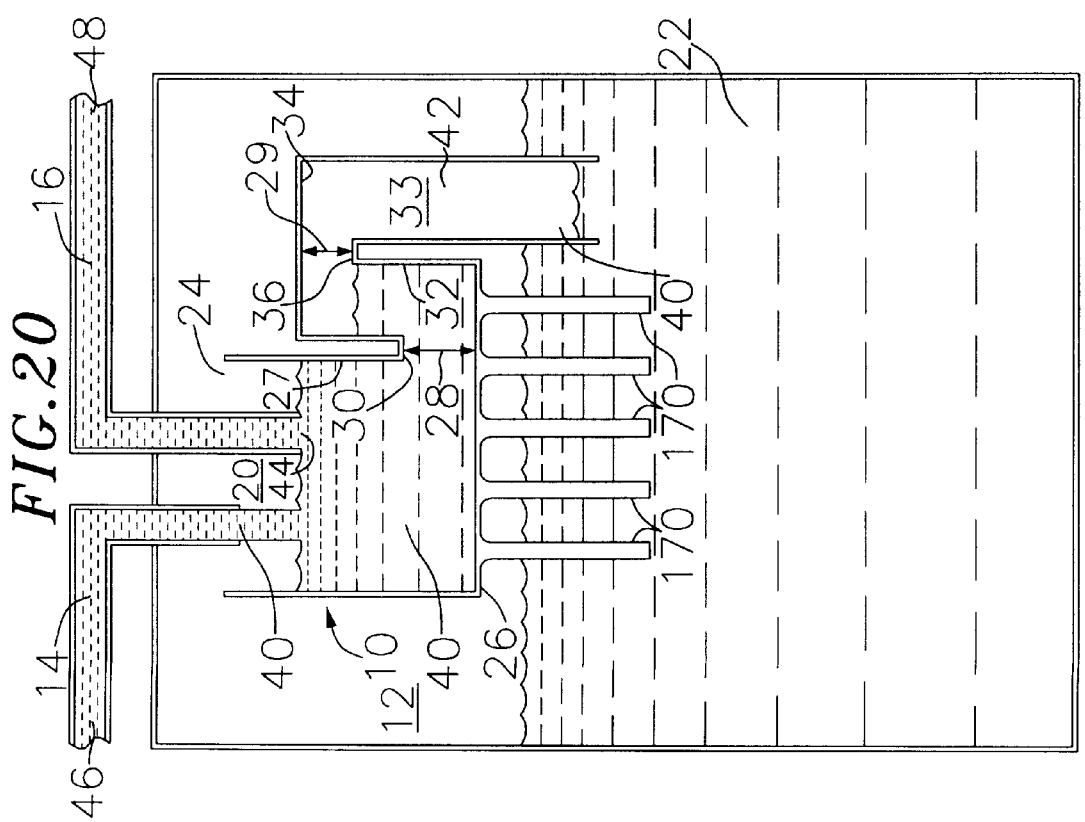
FIG. 20 is a view similar to FIG. 8 illustrating use of a watering device for thermal management of cell electrolyte within an electrolyte battery.

Additionally, if desired, and as depicted in FIG. 20 for simplicity of illustration, LFDs of this invention can be constructed and used to perform electrolyte thermal conditioning in addition to filling and leveling. For example, the LFD 10 can be designed having one or more heat transfer elements 170 that projects downwardly from the bowl bottom or floor 26 a distance from the bell chamber so that each such element 170 is immersed into the electrolyte a desired depth. The heat transfer elements 170 are connected to the LFD 10 at a position that permits conductive heat transfer from the water entering and circulating through the LFD to the electrolyte. The heat transfer elements can be made of from a material having good thermal conductivity properties, such as metal or the like (e.g., stainless steel). A LFD comprising such heat transfer elements may be desirable in applications where heating or cooling the electrolyte is desired for optimum battery performance and/or service life. In such applications, the electrolyte in each cell can be heated by circulating heated water through each LFD, or can be cooled by circulating cooled water through each LFD.

Figure 18:
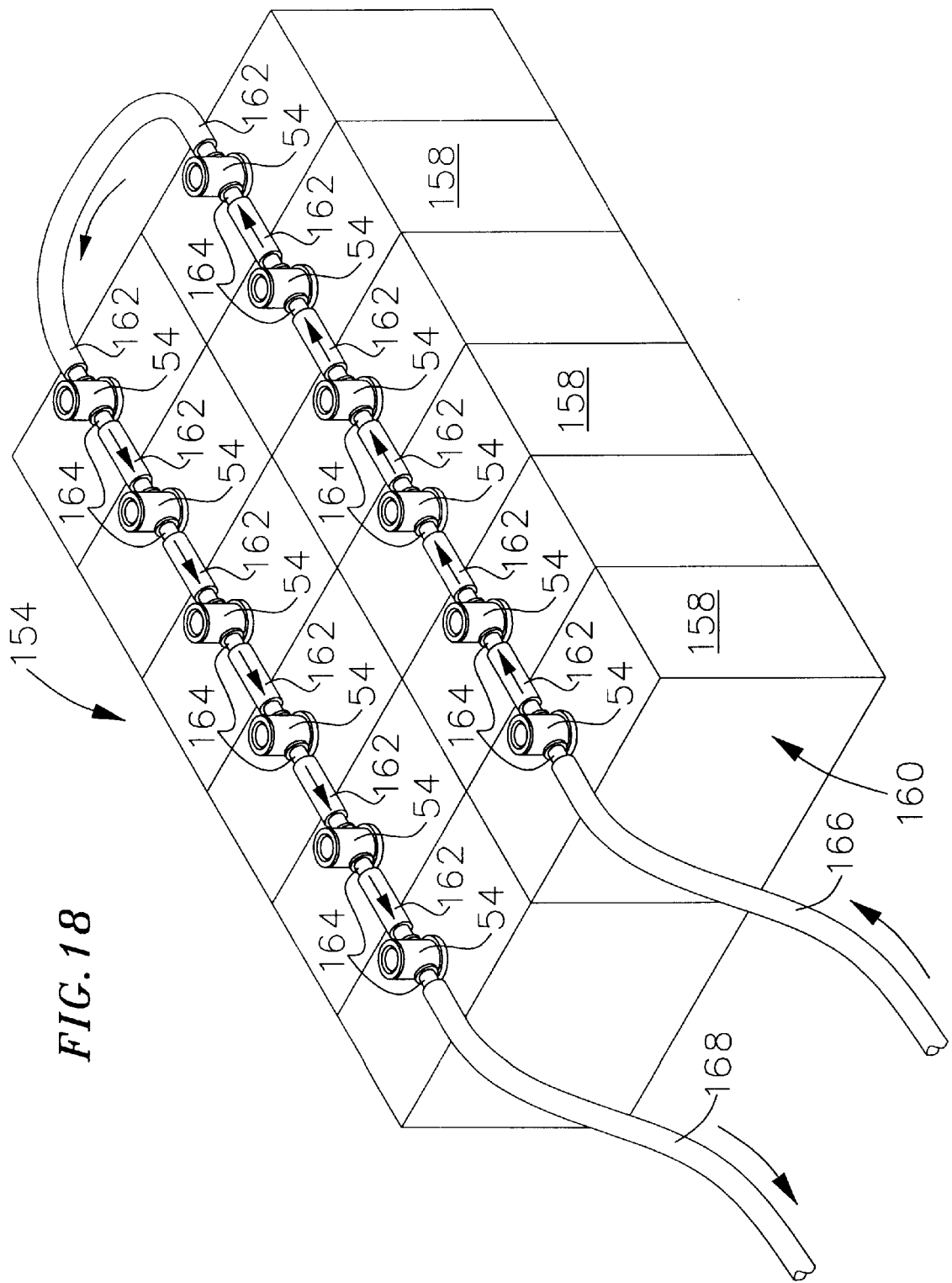
FIG. 18 is a schematic view of an electrolyte leveling and replenishment system comprising a number of the devices shown in FIGS. 10–15 or FIG. 16 installed in electrolytic cells of an electrolyte battery and hydraulically connected in series.

FIG. 18 illustrates a liquid filling system (LFS) 154 comprising a number of LFDs 54 that are described above and illustrated in FIGS. 10–16, and that are each disposed in a respective electrolytic cell 158 of an electrolyte battery 160. The LFDs 54 are hydraulically connected to each other in series via water transport passages 162 that are each interposed between respective water ports 164 of adjacent LFDs.

The LFS illustrated in FIG. 18 is adapted to provide electrolyte leveling and replenishment when a differential pressure is imposed between the water ports 164 of each LFD 54 by either vacuum or pressure operating conditions. The water port 164 of a first LFD 54 is connected to a water supply line 166 that is connected to water source (not shown). In the event that the differential pressure through each LFD is imposed by pressure conditions, the water supply line 166 is connected to a water supply source that is adapted to provide water at a suitable pressure and flow rate, e.g., water at line pressure and the like. In the event that the differential pressure through each LFD is imposed by vacuum conditions, the water supply line 166 is connected to a water source that is adapted to supply water at atmospheric pressure, e.g., from a water reservoir and the like.

FIG. 18 affords an opportunity to note that the bodies of LFDs 54 are rotatable in their mounting collars, so that the angular position of an LFD can be adjusted to efficiently implement any desired scheme for interconnecting the LFD in a multi-cell LFS.

The water port 164 of a terminal LFD 54 is connected to a water drain line 168. If desired, an outlet end of the water drain line may be connected to a water reservoir or the like (not shown) to capture water exiting the LFS after the leveling and replenishment operation is completed.

If desired, a quick-connect type fitting attachment (not shown) can be used to provide a single location connection point for both the water supply line 166 and the water drain line 168. Such fitting attachment may preferably be configured to provide a releasable interlocking water-tight fit between respective ends of the water supply and drain line. It is additionally desired that such fitting attachment include a check valve or the like at each connecting end that is adapted to both permit flow through the coupled line ends when connected, and prevent flow though the uncoupled line ends when disconnected. The use of a fitting attachment configured in this manner is desired because it reduces the steps required to initiate electrolyte leveling and replenishing to two; namely, activating the supply source, and connecting the fitting attachment.

LFS 154 is operated by activating the pressure or vacuum supply source to provide a desired differential pressure within each LFD 54, causing water to be routed to into the first LFD 54. As the water enters the first LFD it passes through the LFD to the electrolytic cell in the same manner described above and illustrated in FIGS. 1–9. Specifically, as the water enters the first LFD 54 and is directed through it via its internal water passages, the electrolyte level in the first cell rises until the pressure of the trapped air in the bell chamber reaches the equalization pressure, causing the water passage into the cell to cease, and causing the water level in the LFD to rise until it reaches the mouth of the empty water passage and is passed therethrough out of the LFD. Water that is circulated through the first LFD is routed via the water transport passage 162 to the water port 164 of the next LFD in the series, where the process repeats itself. Water is circulated between each LFD in the series until the desired electrolyte level in a terminal cell 158 is achieved and water is routed from a respective terminal LFD via its water port 164. Once water is observed to exit from the water drain line 168, the water flow from the water source is terminated by deactivating either the pressure or vacuum supply source.

The water ports 164, water passages within the LFDs, and water transport passages 162 hydraulically connecting the LFDs are purged of water contained therein by one of the four methods described above. Referring to FIG. 18, in an exemplary embodiment, the water can be purged by passing pressurized air through the interconnected electrolytic cells in either direction using line 166 or line 168 as the air input line. Once air is observed to exit from the other line, the air pressure source is disconnected and the electrolyte leveling and replenishment operation is complete.

If desired, the electrolyte leveling and replenishing operation can take place before, after or during the process of charging the battery; during and/or after being preferred.

Although an exemplary LFS has been specifically described above and illustrated in FIG. 18 that makes use of LFDs of FIGS. 10–16, it is to be understood that LFSs of this invention may alternatively make use of other LFDs of this invention, and that such use is intended to be within the scope of this invention.

The foregoing description of presently preferred and other aspects of this invention has been presented by way of illustration and example. It does not present, nor is it intended to present, an exhaustive catalog of all structural and procedural forms by which the invention can be embodied or practiced. Variations upon and alterations of the described structures and procedures can be pursued without departing from the fair substance and scope of the invention consistent with the foregoing descriptions, and the following claims are to be read and interpreted liberally in the context of the state of the art from which this invention has advanced.

What is claimed is:

1. A method for replenishing an electrolytic cell with water to a determined electrolyte level comprising the steps of:

creating a pressure differential between a water inlet passage and water outlet passage of a liquid filling device, causing water to pass through a water inlet passage of the device, through a trap of the device, through a bell chamber of the device, and into an electrolytic cell;

forming a volume of trapped air within the bell chamber and trap when the level of electrolyte within the cell reaches an open end of the bell chamber;

pressurizing the volume of trapped air in the device by continued passage of water to the electrolytic cell until the pressure of the trapped air at least equals a head pressure of water in the device caused by the level of water in the device; and terminating the passage of water into the electrolytic cell to achieve a determined electrolyte level when the pressure of the trapped air at least equals a head pressure of water in the device, wherein the determined electrolyte level is achieved independent of the pressure of water entering the device; and wherein the volume of trapped air prevents electrolyte from passing into the trap during a replenishing operation and after a desired electrolyte level has been achieved.

2. The method as recited in claim 1 further comprising, after the step of terminating water passage into the electrolytic cell, routing water passed into the device through the water outlet passage and out of the device.

3. The method as recited in claim 2 further comprising the step of venting gas from the electrolytic cell through the device during the step of passing water through the device into the electrolytic cell.

4. The method as recited in claim 3 further comprising the step of preventing atmospheric air from passing into the device.

5. The method as recited in claim 1 further comprising, before the step of creating a pressure differential, installing the liquid filling device into an electrolyte fill opening of the electrolytic cell so that at least a portion of the trap and bell chamber is disposed in a head space of the electrolytic cell.

6. A method for replenishing multiple electrolytic cells of an electrolyte battery with water to a determined electrolyte level according to the steps recited in claim 1, further comprising the step of circulating water through hydraulically connected liquid filling devices each mounted in a respective one of the cells after the determined electrolyte level for each respective electrolytic cell has been achieved.

7. A method for replenishing multiple electrolytic cell of an electrolyte battery with water to a determined electrolyte level comprising the steps of:

providing in each cell a liquid filling device having separate water inlet and outlet passages therein and a trap which discharges to a bell chamber;

creating a pressure differential between the water inlet and outlet passages of a first liquid filling device to cause water to pass through a water inlet passage of the first device, through its trap, through its bell chamber, and into a first electrolytic cell;

forming a volume of trapped air within the bell chamber and trap of the first device when the level of electrolyte within the first cell reaches an open end of the bell chamber;

pressurizing the volume of trapped air in the first device by continued passage of water to the first electrolytic cell;

terminating the passage of water into the first electrolytic cell to achieve a determined electrolyte level when the pressure of the trapped air at least equals a head pressure of water in the device, wherein the determined electrolyte level is achieved independent of pressure conditions outside; and circulating water entering the first device through its water outlet passages to a hydraulically connected next device for electrolyte replenishment and leveling of a respective next electrolytic cell, and continuing to circulate water through hydraulically connected devices until a determined electrolyte level for each electrolytic cell is achieved.

8. A method for replenishing an electrolytic cell with water to a determined electrolyte level and thermally conditioning electrolyte within the cell, the method comprising the steps of:

creating a pressure differential between a water inlet passage and water outlet passage of a liquid filling device, causing water to pass through a water inlet passage of the device, through a trap of the device, through a bell chamber of the device, and into an electrolytic cell;

thermally conditioning electrolyte within the cell by immersing a heat transfer element projecting from the device into electrolyte within the cell, the passage of water into the device causing thermal energy to be conductively transferred between the water entering the device and the electrolyte;

forming a volume of trapped air within the bell chamber and trap when the level of electrolyte within the cell reaches an open end of the bell chamber to regulate water flow through the trap and to prevent electrolyte in the cell from entering the cell;

pressurizing the volume of trapped air in the device by continued passage of water to the electrolytic cell until the pressure of the trapped air at least equals a head pressure of water in the device caused by the level of water in the device; and terminating the passage of water into the electrolytic cell to achieve a determined electrolyte level when the pressure of the trapped air at least equals a head pressure of water in the device, wherein the determined electrolyte level is achieved independent of the pressure of water entering the device.

9. A device for leveling and replenishing an electrolytic cell with water, comprising:

a body defining first and second water flow ports;

a trap having a bowl located below the water flow ports, wherein the trap includes an upwardly directed weir and a downwardly directed weir to contain a volume of air within the trap for regulating water flow therethrough, wherein the trap includes an outlet positioned a selected distance below a lip of the upwardly direct weir and below a bowl floor from which the upwardly directed weir projects to provide a desired liquid level to be established in a chamber to which the outlet is connectable; and first and second water passages separately connecting respective ports to the bowl for ingress and egress of water to and from the bowl, wherein the trap outlet location is vertically relative to the lip and the lower end of the one of the first and second passages and the volume distribution between such one passage lower end and the trap outlet being defined to cause water flow through the trap to cease after immersion of the trap outlet and after a volume of air within the trap reaches a sufficient pressure to cause water in the bowl to rise to at least the level of the lower end of such one passage.

10. A device for leveling and replenishing an electrolytic cell with water comprising:

first and second water ports;

first and second water passages that are independent of one another, that communicate to respective water ports, and that have lower ends below the respective water ports;

a trap disposed below the first and second water passages to receive water from one of the first or second water passages, wherein the trap includes a bowl extending above the lower end of the other of the passages and at least one weir positioned within the trap to contain a volume of air therein for regulating water flow therethrough; and a bell chamber disposed adjacent an outlet of the trap and having an open end adapted to direct water passing through the trap into an electrolytic cell, wherein the open end of the bell chamber is disposed a distance below the trap to provide a desired electrolyte level within the cell, and wherein the bell chamber is adapted to trap a volume of air therein with the trap during a leveling and replenishing operation;

wherein the device terminates water flow into the electrolytic cell independent of water supply pressure when the pressure of trapped air within the trap and bell chamber is at least equal to a pressure head of water within the trap caused by the level of water in the trap, and thereafter bypasses water flow through the device without passing electrolyte through the device.

11. The device as recited in claim 10 wherein the passages, the trap and the bell chamber are defined in a body adapted for placement within an electrolyte fill opening of an electrolytic cell and includes means for providing a releasible locking attachment therewith, and wherein the trap and bell chamber are at least partially disposed within a head space of the electrolytic when the device is installed within the electrolyte fill opening.

12. The device as recited in claim 10 wherein the trap includes:
   a first downwardly directed weir having a first weir lip; and
   a second upwardly directed weir having a second weir lip;
   wherein water is directed in the device from the one water passage into the trap, over the first weir lip, over the second weir lip, and into the bell chamber; and
   wherein the first and second weirs are positioned within the trap to contain a volume of air therein that prevents electrolyte in the cell from entering the trap after a desired electrolyte fill level has been achieved.

13. The device as recited in claim 12 wherein the first and second weirs are each disposed within the bell chamber.

14. The device as recited in claim 10 comprising a central chamber disposed axially therein that is independent of the water passages for transporting gas through the device.

15. The device as recited in claim 10 further comprising means for removing gas from the electrolytic cell through the device independent of the trap and the water passages.

16. The device as recited in claim 15 wherein the means for removing gas permits one-way flow of gas from the electrolytic cell and prevents atmospheric air from entering the device.

17. The device as recited in claim 15 wherein the means for removing gas comprises:
   a vent passage extending axially through the device, the vent passage including a vent port that extends through a body wall and that is adapted to receive gas from a head space of the electrolytic cell; and
   a vent opening disposed adjacent a top end of the device and in communication with the vent passage, the vent opening including check valve means for providing one-way flow of gas therethrough only from the device.

18. The device as recited in claim 10 wherein the device is an integral part of an electrolyte battery.

19. An electrolytic cell leveling and replenishing system comprising a number of devices as recited in claim 2 each installed into a respective electrolytic cell of an electrolyte battery, the several devices being hydraulically connected to one another to permit water circulation therebetween and leveling of each electrolytic cell from a single connection to a water source.

20. A device for filling an electrolytic cell with water and providing a determined electrolyte level within the cell, the device comprising:
   a body;
   first and second water ports that open into the body, and connected therein to respective first and second water passages that are independent of one another and that extend downwardly in the body;
   a trap disposed within the body below the first and second water passages, the trap having a weir arrangement between an inlet positioned to receive water from one of the passages and a trap outlet; and
   a bell chamber disposed adjacent the trap outlet and having an open end adapted to direct water passing through the trap into an electrolytic cell, wherein the trap and bell chamber are adapted to trap a volume of air therein during a filling operation;
   wherein the device is adapted to cease water flow into the electrolytic cell independent of water supply pressure when the pressure of trapped air within the trap and bell chamber is at least equal to a pressure head of water within the trap caused by the level of water in the trap; and
   wherein the trap and bell chamber are designed to prevent the passage of electrolyte from the electrolyte cell into the trap during a filling operation and after a desired electrolyte level has been achieved.

21. The device as recited in claim 20 wherein the body is adapted for installation into an electrolytic fill opening of an electrolytic cell and includes means for providing a releasible attachment therewith, wherein at least a portion of the trap and bell chamber is disposed within a head space of the electrolytic cell when the device is installed within the electrolyte fill opening.

22. The device as recited in claim 20 comprising a gas passage disposed within the body and independent of the water passages, the gas passage communicating with a vent port that extends through a body wall to accommodate the passage of gas into the body from the electrolytic cell.

23. The device as recited in claim 22 further comprising;
   a vent opening through the body and in communication with the gas passage, wherein the vent opening is located to be outside of the electrolytic cell when the device is connected to the electrolytic cell; and
   a check valve associated with the vent opening top provide one-way flow of gas from the device.

24. An electrolyte battery comprising a number of electrolytic cells, wherein the battery includes a like number of the devices according to claim 12 each configured as an integral part of the battery.

25. The device as recited in claim 20 wherein the other one of the passage is positioned so that when a determined electrolyte level within the electrolytic cell is achieved, water that flows into the device is routed therefrom by the other passage.

26. The device as recited in claim 20 wherein the trap is at least partially disposed within the bell chamber.

27. The device as recited in claim 20 wherein the device is symmetric about an axis running axially through the body.

28. An electrolytic cell leveling and replenishing system comprising a number of devices as recited in claim 19 each installed into a respective electrolytic cell of an electrolyte battery, wherein each device is hydraulically connected to another device to permit water circulation therebetween and leveling of each electrolytic cell.

29. A device for filling an electrolytic cell with water and providing a determined electrolyte level within the cell without passing electrolyte from the cell through the device, the device comprising:
   a body, first and second water ports that extend into the body at an upper end thereof, and first and second water passages that are independent of one another and that extend downwardly in the body from respective ports axially through the body, and including mounting means for mounting the body within an electrolyte fill opening of an electrolyte battery;

a trap having an inlet bowl disposed within the body below the first and second water passages and including a first downwardly directed weir and a second upwardly directed weir, the trap being located to receive water from one of the water passages to pass the water under the first weir and over the second weir; and a bell chamber disposed adjacent an outlet of the trap and having an open end adapted to direct water passing through the trap into an electrolytic cell, the trap and bell chamber being adapted to trap a volume of air therein during a filling operation to both regulate water flow through the trap and to prevent electrolyte flow from the cell into the trap, at least a portion of the trap and bell chamber being disposed below the mounting means within a head space of an electrolytic cell when the device is mounted within an electrolyte fill opening;

wherein the device is adapted to cease water flow into the electrolytic cell independent of water supply pressure to the body when the pressure of trapped air within the trap and bell chamber is at least equal to a pressure head of water within the trap caused by the level of water in the bowl.

30. The device as recited in claim 29 wherein the device comprises a gas passage positioned within the body between the first and second water passages and independent of the water passages.

31. The device as recited in claim 29 wherein the other passage is positioned so that when a determined electrolyte level within the electrolytic cell is achieved, water entering the device is routed therefrom by such other passage.

32. The device as recited in claim 29 wherein the trap is at least partially disposed within the bell chamber.

33. The device as recited in claim 29 wherein the device is symmetric about an axis running axially through the body.

34. An electrolytic cell leveling and replenishing system comprising a number of devices as recited in claim 21 that are each installed into a respective electrolytic cell of an electrolyte battery, wherein each device is hydraulically connected to another device to permit water circulation therebetween and leveling of each electrolytic cell.

35. A watering apparatus retrofittable to a cell of a lead-acid battery for adding water to the cell to establish in the cell a desired level of acid electrolyte, the apparatus comprising:

a tubular body having exterior features by which the body is mountable in a cell filling opening with an upper end of the body located outside the cell and a lower end of the body located in the cell a selected distance below a desired electrolyte level;

a pair of water flow ports extending to an interior of the body at the upper end of the body, the body defining internally thereof a water flow passage between the ports that has a lower portion located below the ports, the body also defining internally thereof a water flow trap having an inlet communicating to the passage lower portion and an outlet at the body lower end, the relative vertical locations of the trap elements and the passage lower portion being cooperatively defined in combination with the volume distribution of the passage lower portion and the trap elements to cause a volume of air to be contained within the trap and to cause the passage lower portion to be flooded by water flowing through one of the ports into the body when the level of electrolyte in the cell has been raised to the desired level by water passing through the trap to pressurize the volume of air a desired amount to cause the trap then to cease to pass water to the cell, wherein the volume of air also prevents passage of electrolyte from the cell into the trap during a filling operation and after a desired electrolyte level has been achieved.

36. The apparatus as recited in claim 35 wherein the body defines internally thereof a gas flow path that extends from an inlet opening below the exterior features independently of the water flow passages.

37. The apparatus as recited in claim 36 wherein the body includes:

a gas outlet at the upper end of the body for venting gas from the gas flow path; and a check valve means at the upper end of the body to permit flow of gas through the gas outlet only outwardly from the body.

38. The apparatus as recited in claim 35 wherein the water flow path defines the sole path for water flow between the ports within the body.

39. A device for leveling and replenishing an electrolytic cell with water comprising:

first and second water ports;

first and second water passages that are independent of one another, that communicate to respective water ports, and that have lower ends below the respective water ports;

a trap disposed below the first and second water passages to receive water from one of the first or second water passages, the trap including a pair of weirs disposed therein;

a bell chamber disposed adjacent an outlet of the trap and having an open end adapted to direct water passing through the trap into an electrolytic cell, wherein the trap weirs are positioned within the trap to act with the bell chamber to trap a volume of air therein during a leveling and replenishing operation to prevent electrolyte in the cell from entering the trap;

a heat transfer element projecting downwardly from a portion of the device in contact with water entering the device from one of the passages, the heat transfer element being adapted to enter electrolyte within a cell to transfer thermal energy from the water within the trap to the electrolyte;

wherein the device terminates water flow into the electrolytic cell independent of water supply pressure when the pressure of trapped air within the trap and bell chamber is at least equal to a pressure head of water within the trap caused by the level of water in the trap, and thereafter bypasses water flow through the device.

* * * * *

UNITED STATES PATENT AND TRADEMARK OFFICE
CERTIFICATE OF CORRECTION

PATENT NO. : 6,164,309
DATED : December 26, 2000
INVENTOR(S) : William B. Brecht It is certified that error appears in the above-identified patent and that said Letters Patent is hereby corrected as shown below:

Column 22,
Line 27, replace "direct weir" with -- directed weir --.

Column 23,
Line 52, replace "claim 2" with -- claim 10 --.

Column 24,
Line 40, replace "claim 12" with -- claim 20 --.
Line 52, replace "claim 19" with -- claim 27 --.

Column 25,
Line 37, replace "claim 21" with -- claim 29 --.

Signed and Sealed this

Twentieth Day of August, 2002

Attest:

Attesting Officer

JAMES E. ROGAN
Director of the United States Patent and Trademark Office